United States Patent
Nakajo

(10) Patent No.: US 11,882,619 B2
(45) Date of Patent: Jan. 23, 2024

(54) WIRELESS COMMUNICATION SYSTEM AND WIRELESS COMMUNICATION METHOD

(71) Applicant: MURATA MACHINERY, LTD., Kyoto (JP)

(72) Inventor: Natsuko Nakajo, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 479 days.

(21) Appl. No.: 17/269,280

(22) PCT Filed: Jul. 2, 2019

(86) PCT No.: PCT/JP2019/026203
§ 371 (c)(1),
(2) Date: Feb. 18, 2021

(87) PCT Pub. No.: WO2020/044774
PCT Pub. Date: Mar. 5, 2020

(65) Prior Publication Data
US 2021/0259046 A1 Aug. 19, 2021

(30) Foreign Application Priority Data
Aug. 27, 2018 (JP) .................................. 2018-158394

(51) Int. Cl.
*H04W 76/30* (2018.01)
*H04W 76/19* (2018.01)
(Continued)

(52) U.S. Cl.
CPC .......... *H04W 76/30* (2018.02); *H04W 76/14* (2018.02); *H04W 76/18* (2018.02); *H04W 76/19* (2018.02)

(58) Field of Classification Search
CPC ...... G05B 19/418; G05B 23/02; G05B 19/18; G05B 19/421; G05B 19/04; G05B 11/00;
(Continued)

(56) References Cited

U.S. PATENT DOCUMENTS

| 2011/0010006 A1 | 1/2011 | Tani et al. |
| 2016/0075015 A1 | 3/2016 | Izhikevich et al. |

FOREIGN PATENT DOCUMENTS

| CN | 101939145 A | 1/2011 |
| CN | 106773749 A | 5/2017 |

(Continued)

*Primary Examiner* — Tu X Nguyen
(74) *Attorney, Agent, or Firm* — Keating & Bennett, LLP

(57) ABSTRACT

A safety signal system includes portable remote controllers and a second receiver to control a stacker crane in accordance with an instruction received wirelessly from the portable remote controllers. For example, one of the portable remote controllers and the second receiver are able to establish a wireless connection by being in a pairing state in which the single second receiver is fixed as a connection partner of the one portable remote controller. After the wireless connection is established, the pairing state is continued in a state where the wireless connection is not able to be maintained before an operation to disconnect the wireless connection is performed. After the wireless connection is not able to be maintained, the wireless connection is re-established on a condition that power of both the one portable remote controller and the second receiver which are in the pairing state is turned on.

12 Claims, 14 Drawing Sheets

(51) Int. Cl.
    *H04W 76/18*     (2018.01)
    *H04W 76/14*     (2018.01)

(58) Field of Classification Search
    CPC ......... G05B 23/00; G06Q 20/32; H04W 4/80;
        H04W 12/06; H04W 12/12; H04W 12/50;
        H04W 76/30; H04W 76/00; H04W 76/25;
        H04W 12/082; H04W 60/06; H04W 12/062
    See application file for complete search history.

(56)     References Cited

FOREIGN PATENT DOCUMENTS

| | | |
|---|---|---|
| JP | 2016-100754 A | 5/2016 |
| JP | 2017-175324 A | 9/2017 | able
WIRELESS COMMUNICATION SYSTEM AND WIRELESS COMMUNICATION METHOD

BACKGROUND OF THE INVENTION

1. Field of the Invention

The present invention relates to a wireless communication system and a wireless communication method.

2. Description of the Related Art

Conventionally, a communication system is known in which pairing is performed between a slave device and a master device, and communication is performed between the slave device and the master device. Japanese Patent Application Laid-Open No. 2016-100754 discloses this type of a communication system.

Japanese Patent Application Laid-Open No. 2016-100754 discloses a power line communication device for performing communication by not wireless but a wire (power line). The power line communication device includes a terminal and a master device for intercommunication with the terminal. The power line communication device establishes pairing between the terminal and the master device through a connection sequence.

In the connection sequence performed by the power line communication device of Japanese Patent Application Laid-Open No. 2016-100754, the terminal device starts to transmit a request signal by pressing of a pairing start button of the terminal device as a trigger. The master device transmits a response signal to the terminal device in response to the pressing of a pairing perform button thereof during the request signal is received from the terminal device. Upon receiving the response signal from the master device, the terminal device generates a PSK (pre-shared key) by using a predetermined algorithm and sends an acknowledge signal to the master device. Upon receiving the acknowledge signal from the terminal device, the master device generates a PSK using a predetermined algorithm.

In the power line communication device, after a series of connection sequences, a pair of PSKs is generated at both the terminal device and the master device to complete mutual authentication between them. As a result, a pairing between the terminal device and the master device is established. The pairing between them is not released unless the pairing is intentionally released. In order to release the pairing, it is necessary to perform an unpairing operation, for example, pressing the unpairing button.

In other words, in the power line communication device of Japanese Patent Application Laid-Open No. 2016-100754, even if a main power of the terminal device is turned off and the terminal device and the master device cannot communicate, the pairing is not released. The power line communication device completes mutual authentication between the terminal device and the master device without performing the connection sequence at the time when the main power of the terminal device in power-off state is turned on (that is, when the power is turned on again). Japanese Patent Application Laid-Open No. 2016-100754 discloses that as a result of the configuration, communication between the terminal device and the master device which are established the pairing beforehand is quickly restored.

In the configuration of Japanese Patent Application Laid-Open No. 2016-100754, the communication between the terminal device and the master device is automatically restored even when the operator is not strongly aware of restoring the communication between the terminal device and the master device, and aimlessly turns on the terminal device again. In other words, even if the operator does not specifically intend to restore the communication, the communication is restored, which may cause unanticipated consequences.

SUMMARY OF THE INVENTION

Preferred embodiments of the present invention provide communication systems in each of which an operator is able to clearly distinguish and recognize whether or not a wireless connection is to be re-established when a wireless connection already established is not able to be maintained.

Problems to be solved by preferred embodiments of the present invention are as described above, and next, features to address the problems and effects thereof will be described.

According to a preferred embodiment of the present invention, a communication system includes a transmitter and a receiver. The transmitter wirelessly transmits an instruction. The receiver controls an industrial machine according to the instruction received from the transmitter. A wireless connection between the transmitter and the receiver is able to be established by establishing a partner fixed state in which the receiver is fixed as a connection partner of the transmitter. After the wireless connection is established, the partner fixed state is continued in a state where the wireless connection is not able to be maintained before an operation to disconnect the wireless connection is performed. After the wireless connection is not able to be maintained, the wireless connection between the transmitter and the receiver is re-established on a condition that a predetermined operation is performed on both the transmitter and the receiver which are in the partner fixed state.

Accordingly, in order to re-establish the wireless connection, the operator is required to operate both the transmitter and the receiver. Thus, since the re-establishment of the wireless connection is able to be strongly reminded to the operator, this prevents the operator from misinterpreting whether the industrial machine is controlled by the operation of the transmitter or not.

In the communication system described above, in a case where the wireless connection between the transmitter and the receiver is not able to be maintained and the partner fixed state is continued, establishment of another wireless connection between another transmitter and the receiver is prevented.

Accordingly, an unintended transmitter and the receiver are able to be prevented from establishing the wireless connection. That is, even in a situation where the connection between the transmitter and the receiver is not able to be maintained, the wireless connection between another transmitter and the receiver is not established unless the pairing state of the transmitter is explicitly released. Thus, the communication system is able to prevent misinterpretation by the operator as to which transmitter is able to control the industrial machine.

In the communication system described above, in a case where the wireless connection between the transmitter and the receiver is not able to be maintained and the partner fixed state is continued, the partner fixed state is able to be released by performing a forced release operation to forcibly release the partner fixed state to at least one of the transmitter and the receiver.

The above features are able to avoid a situation in which another transmitter is not able to establish the wireless connection with the receiver at all when the transmitter that is in the pairing state with the receiver fails, for example, by forcibly releasing the partner fixed state. In addition, a situation is able to be avoided in which another receiver is not able to establish the wireless connection with the transmitter at all when the receiver that is in the pairing state with the transmitter fails, for example, by forcibly releasing the partner fixed state.

The forced release operation may include two operations. The first operation is an operation to enable at least one of the transmitter and the receiver in which the partner fixed state is continued to be in a maintenance mode in which a setting about the partner fixed state is able to be performed. The second operation is an authentication operation to input authentication information to at least one of the transmitter and the receiver.

Accordingly, security is able to be ensured when forcibly releasing the partner fixed state.

In the communication system described above, the predetermined operation may satisfy the condition of re-establishing the wireless connection between the transmitter and the receiver performed on both the transmitter and the receiver includes an operation of turning on power.

Accordingly, existing implementations to turn on the power are able to be included, thus reducing the cost.

After the wireless connection is established, the receiver wirelessly may transmit a confirmation signal to the transmitter to confirm whether the wireless connection between the transmitter and the receiver is normal or not. The receiver determines that the wireless connection is not able to be maintained when the receiver does not receive a response to the confirmation signal from the transmitter to which the confirmation signal is sent.

Accordingly, the wireless connection status is able to be properly monitored.

After the wireless connection is established, the receiver may wirelessly transmit a confirmation signal to the transmitter to confirm whether the wireless connection between the transmitter and the receiver is normal or not. The transmitter determines that the wireless connection is not able to be maintained when the transmitter does not receive the confirmation signal from the receiver.

Accordingly, the wireless connection status is able to be properly monitored.

In the communication system described above, information indicating that at least one of the transmitter and the receiver is in the partner fixed state or not may be output to other device.

Accordingly, the operator is able to easily recognize the partner fixed state of the transmitter and the receiver using a device.

According to another preferred embodiment of the present invention, the following communication method is provided. That is, the communication method includes six steps. In the first step, a transmitter and a receiver establish a partner fixed state in which the single receiver is fixed as a connection partner of the transmitter to establish a wireless connection. In the second step, the wireless connection between the transmitter and the receiver in the partner fixed state is established. In the third step, the transmitter wirelessly transmits an instruction after establishing the wireless connection. In a fourth step, the receiver controls an industrial machine in accordance with the instruction received from the transmitter. In a fifth step, the partner fixed state of the transmitter and the receiver is maintained after establishing the wireless connection in a state where the wireless connection is not able to be maintained before performing an operation to disconnect the wireless connection. In the sixth step, the wireless connection between the transmitter and the receiver is re-established on a condition that a predetermined operation is performed on both the transmitter and the receiver which are in the partner fixed state after not being able to maintain the wireless connection.

Accordingly, in order to re-establish the wireless connection, the operator is required to operate both the transmitter and the receiver. Thus, since the re-establishment of the wireless connection is able to be strongly reminded to the operator, this prevents the operator from misinterpreting whether the industrial machine is controlled by the operation of the transmitter or not.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Figure 1:
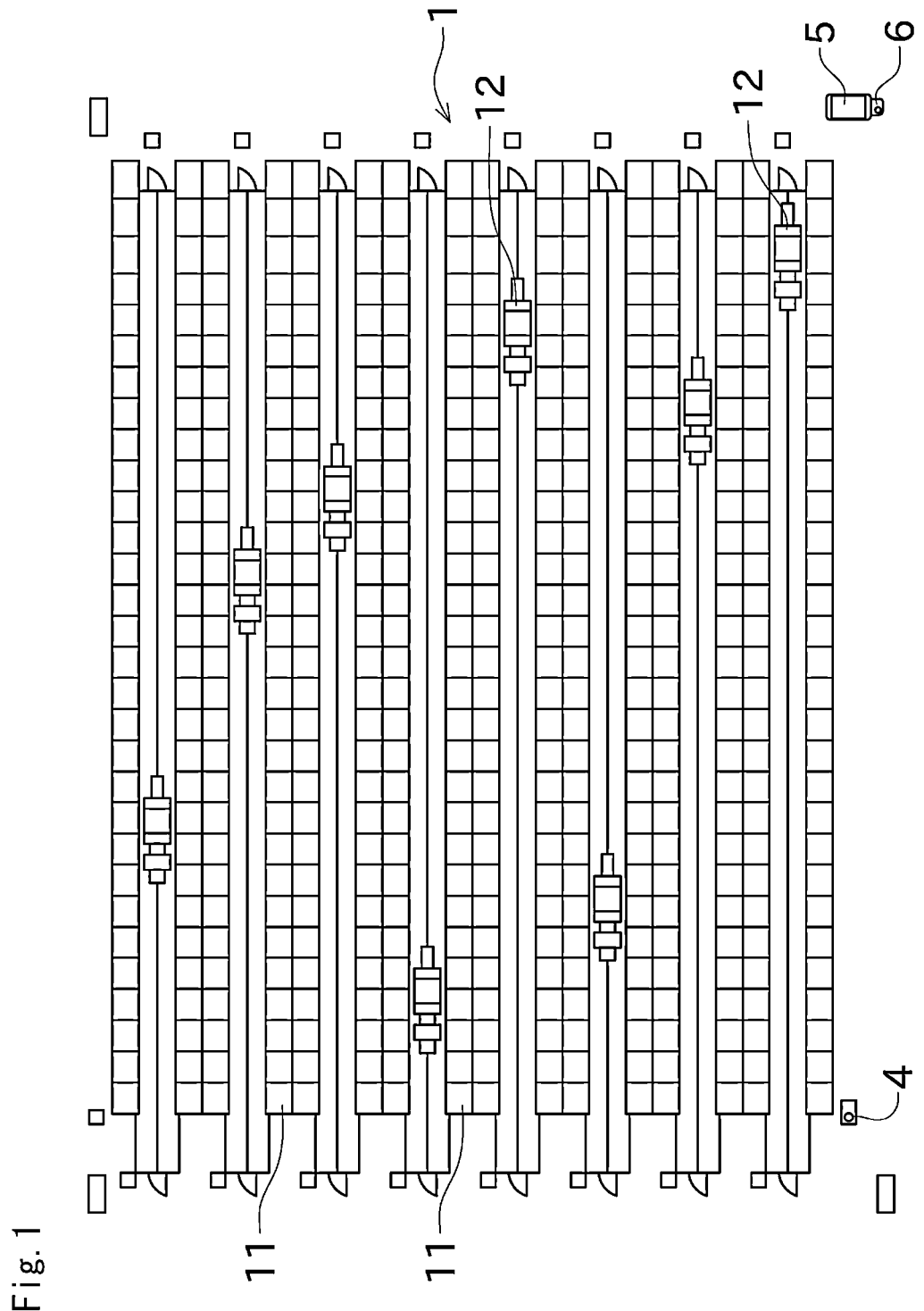
FIG. 1 is a plan view showing an automated warehouse in which a wireless communication method is performed according to a preferred embodiment of the present invention.
Figure 2:
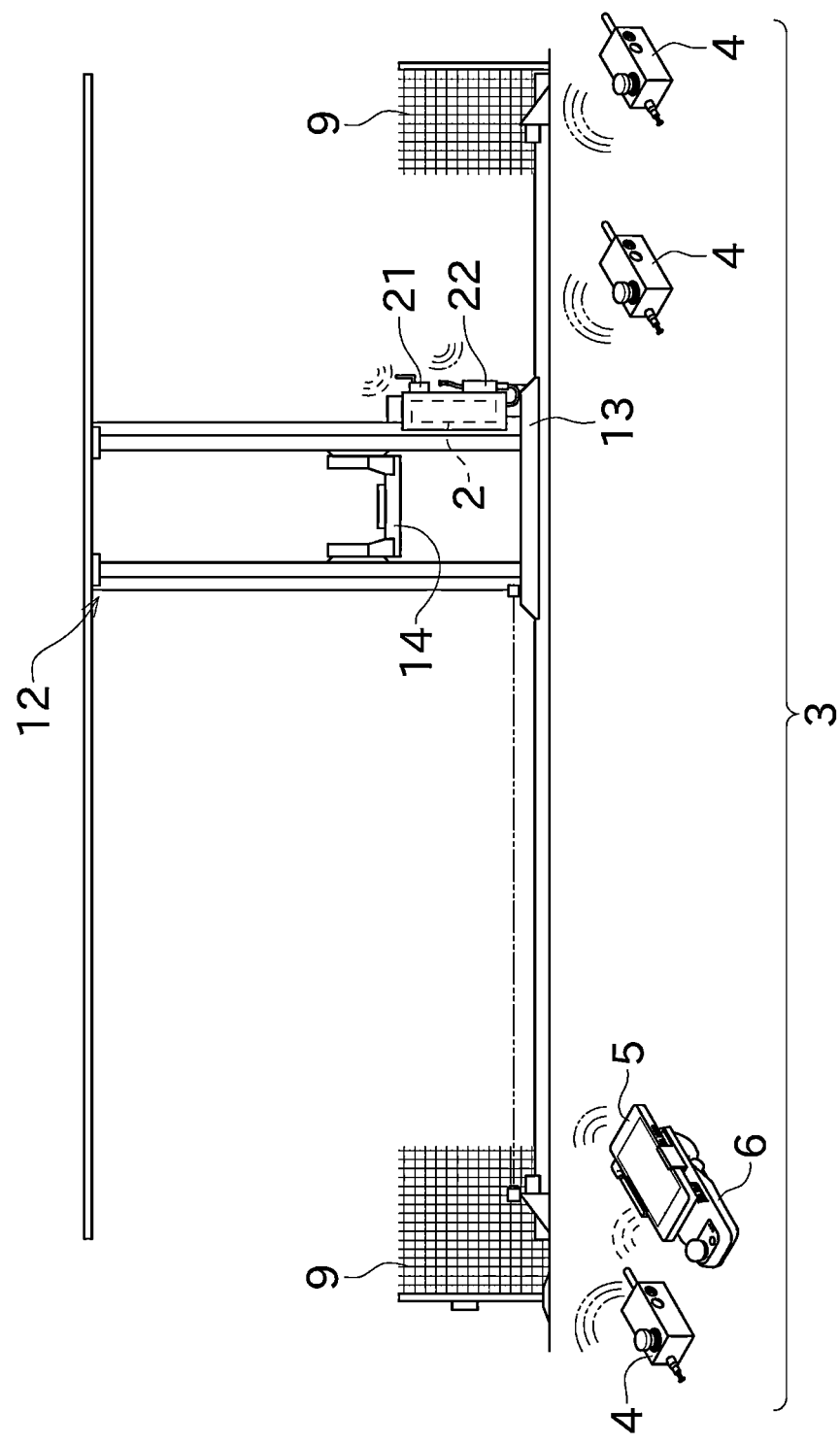
FIG. 2 is a diagram illustrating one of stacker cranes included in the automated warehouse.
Figure 3:
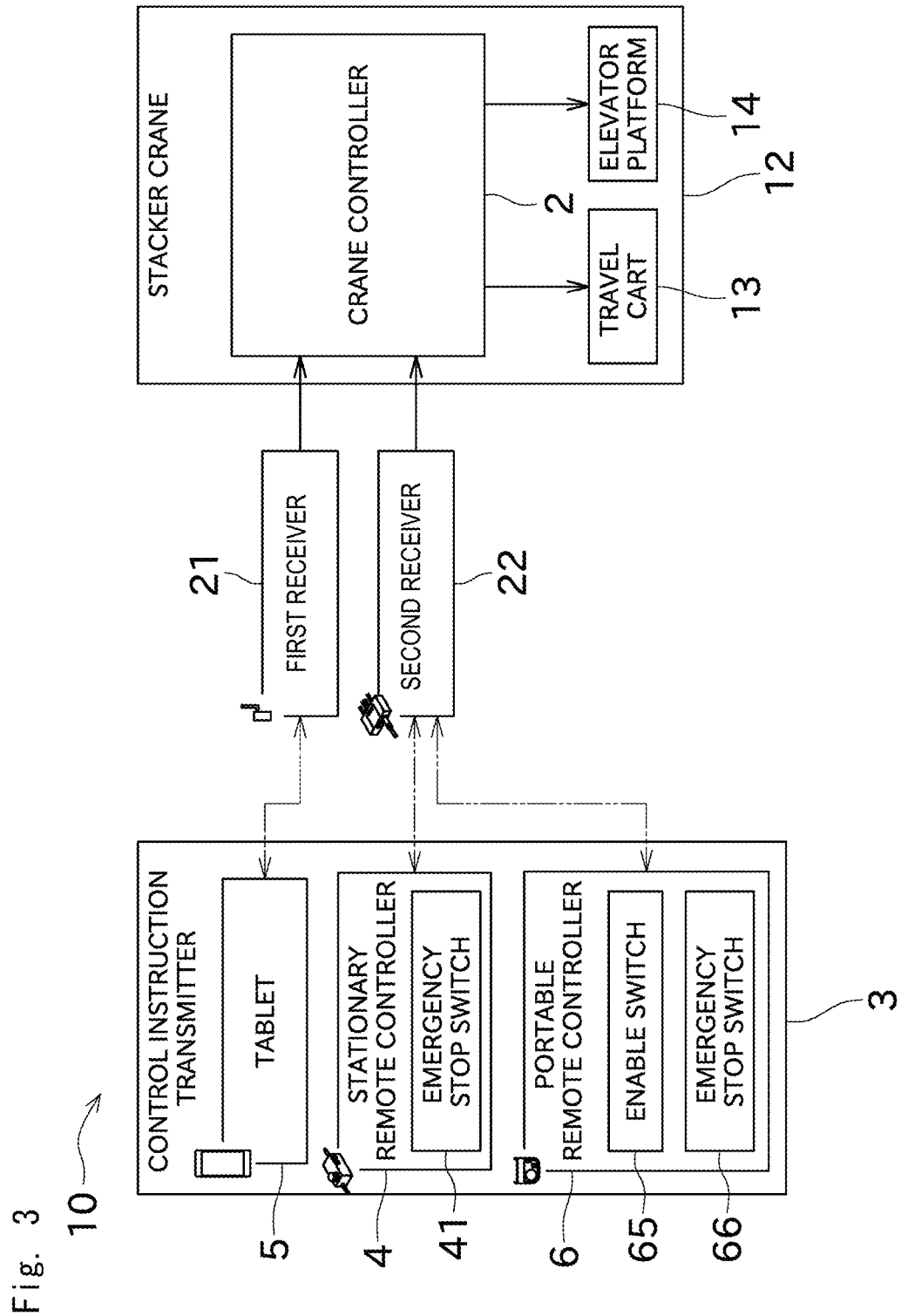
FIG. 3 is a block diagram showing a control system of the stacker crane.
Figure 4:
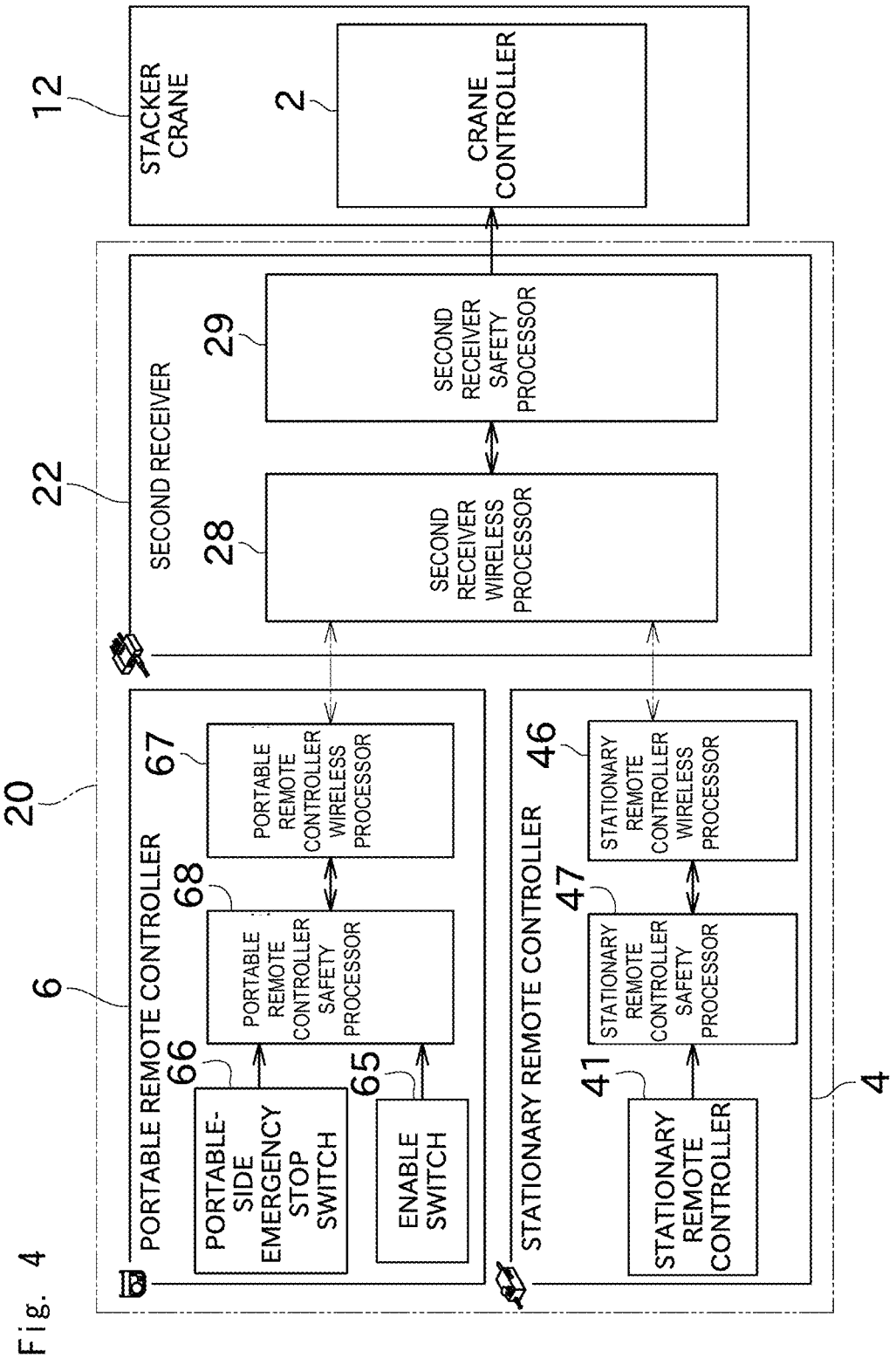
FIG. 4 is a block diagram showing a safety signal system.

Hereinafter, preferred embodiments of the present invention will be described with reference to the drawings. FIG. 1 is a plan view showing an automated warehouse 1 in which a wireless communication method is performed according to a preferred embodiment of the present invention. FIG. 2 is a diagram illustrating one of stacker cranes 12 included in the automated warehouse 1. FIG. 3 is a block diagram showing a control system 10 of the stacker crane 12. FIG. 4 is a block diagram showing a safety signal system 20.

The automated warehouse 1 shown in FIG. 1 includes a plurality of stacker racks 11 and a plurality of stacker cranes (industrial machines) 12. The stacker racks 11 include many storage spaces that are able to store goods, for example, parts and materials. The stacker cranes 12 automatically load/unload goods into/from the storage spaces of the stacker racks 11. Through the stacker cranes 12, the automated warehouse 1 can automatically store goods into the stacker racks 11, and can automatically unload goods stored in the stacker racks 11.

As shown in FIG. 2, each of the stacker cranes 12 includes: a travel cart 13 that travels along a track; an elevator platform 14 that is able to ascend and descend vertically; and a crane controller (machine controller) 2 that controls operations of the travel cart 13 and the elevator platform 14.

In operating the stacker crane 12, its operation mode can be selected from an automatic operation mode and a manual operation mode. In the automatic operation mode, the stacker crane 12 automatically operates in accordance with a pre-programmed rule. In the manual operation mode, the stacker crane 12 operates in accordance with an operation instruction input by an operator.

The crane controller 2 shown in FIG. 2 and FIG. 3 includes known controllers, for example, a CPU, a ROM, a RAM, and an input/output unit. The ROM stores various programs, data (rules) relating to an automatic operation, and the like. The CPU is able to read out the various programs, etc. from the ROM, and execute them.

When the automatic operation mode is selected as the operation mode of the stacker crane 12, the crane controller 2 controls operations of the travel cart 13 and the elevator platform 14 based on the stored data relating to the automatic operation, and the like.

When the manual operation mode is selected as the operation mode of the stacker crane 12, the crane controller 2 controls operations of the travel cart 13 and the elevator platform 14 in accordance with an operation instruction provided by the operator and a state signal of each switch. The operation instruction is received via a first receiver 21. The state signal is received via a second receiver 22.

In the automated warehouse 1, an area including an operation area of the stacker crane 12 is partitioned by a fence 9 or the like, as shown in FIG. 2, to prevent goods from being touched, for example. The partitioned area is defined as a restricted area. In order to detect the operator entering the operation area for maintenance work, etc., a sensor is located at a door in the fence 9, for example. The door and sensor are not shown in FIG. 2. If the sensor detects the door being opened while the stacker crane 12 is operating in the automatic operation mode, the operation of the stacker crane 12 automatically stops.

The automated warehouse 1 includes the first receiver 21 and the second receiver 22. The first receiver 21 and the second receiver 22, each of which is a communication device, are installed near the crane controller 2 of the stacker crane 12. The first receiver 21 and the second receiver 22 are electrically connected to the crane controller 2. One stacker crane 12 is provided with one first receiver 21 and one second receiver 22.

The first receiver 21 wirelessly communicates with a tablet 5, which will be described later, via a wireless LAN. The wireless LAN includes a plurality of wireless communication channels, and uses a radio wave, an infrared ray, or the like to transmit data. In this preferred embodiment, Wi-Fi (registered trademark) is used as the wireless LAN. This wireless communication allows the first receiver 21 to receive an operation instruction that is inputted to the tablet 5 by the operator operating the tablet 5. Examples of the operation instruction include an instruction to make the travel cart 13 travel, an instruction to ascend or descend the elevator platform 14, and the like. The first receiver 21 outputs a signal indicating an instruction to the crane controller 2, the signal defining and functioning as a control signal to control operations of the stacker crane 12.

The second receiver 22 wirelessly communicates with a stationary remote controller 4 and a portable remote controller 6, which will be described later, via a wireless LAN. In this preferred embodiment, Wi-Fi (registered trademark) is used as the wireless LAN. This wireless communication allows the second receiver 22 to receive various state signals. Examples of the state signal include a state signal indicating a state of an emergency stop switch, a state signal indicating a state of an enable switch that enables an operation instruction input from the tablet 5, and the like. The second receiver 22 outputs the received state signal to the crane controller 2, the received state signal defining and functioning as a control signal to control operations of the stacker crane 12. The first receiver 21 and the second receiver 22 communicate on different frequency bands or different channels.

Figure 5:
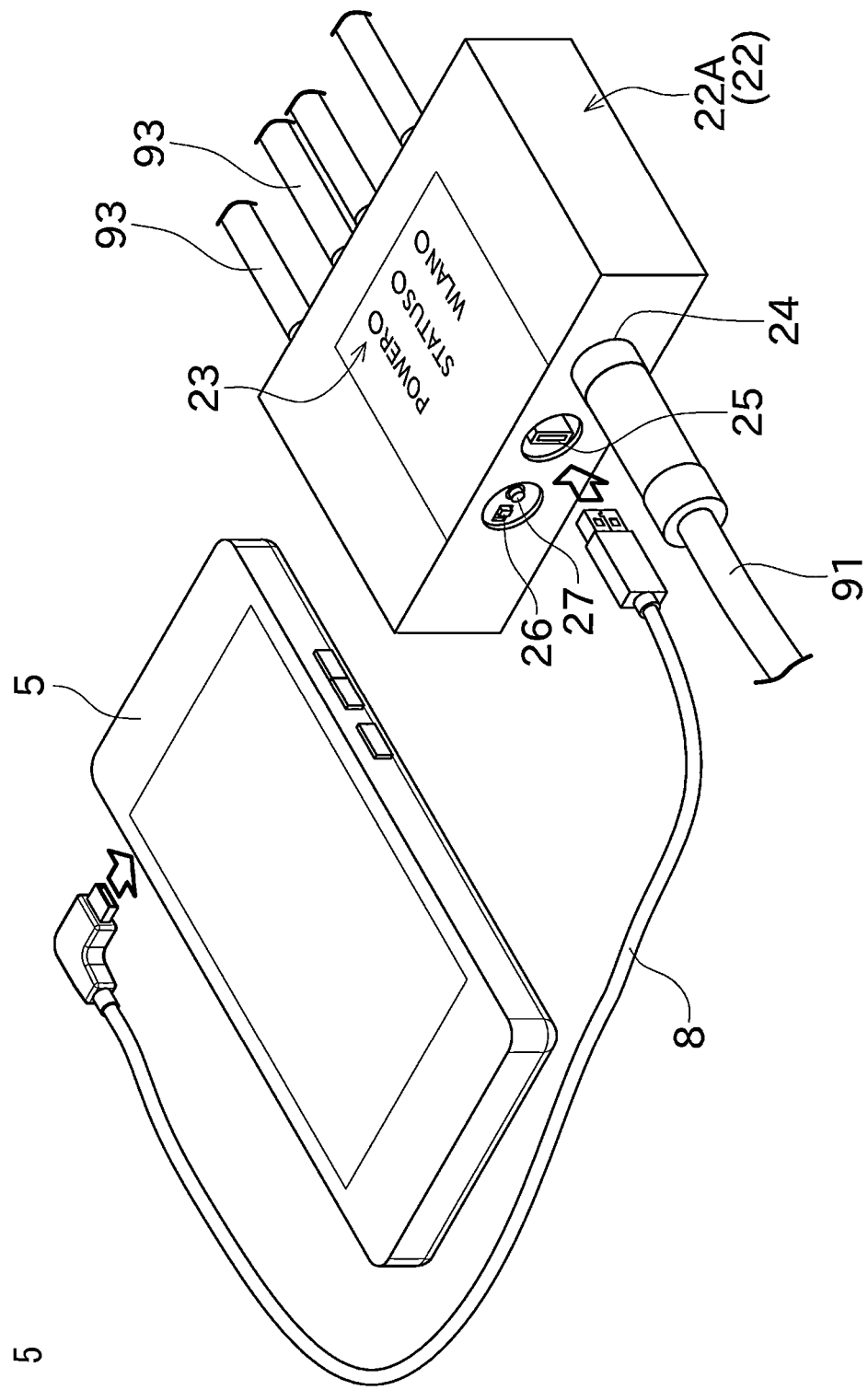
FIG. 5 is a perspective view showing a second receiver.

As shown in FIG. 5, the second receiver 22 includes a second receiver state display 23, a second receiver power connector 24, a second receiver USB connector 25, a second receiver maintenance switch 26, and a confirm button 27.

The second receiver state display 23 includes three lamps, namely, a power indicator lamp, a status lamp, and a WLAN lamp. Each of the lamps is an LED. The second receiver state display 23 indicates various operation states of the second receiver 22 by combinations of lighting colors and lighting states (lighting or blinking) of the LEDs.

A power cable 91 is connected to the second receiver power connector 24. Through the power cable 91, electric power necessary for operations of the second receiver 22 is supplied. The power cable 91 includes a plurality of electric wires. The power cable 91 not only supplies electric power but also defines and functions as a signal cable to input and output signals. In the second receiver 22 of this preferred embodiment, a power switch is omitted. Powering on/off the second receiver 22 is implemented by attachment/detachment of the power cable 91 to/from the second receiver power connector 24. It however may be acceptable that the second receiver 22 includes a power switch.

The second receiver 22 includes a connector (not shown) for electrical connection of an antenna cable 93, in addition to the second receiver power connector 24. A wireless antenna (not shown) for transmission and reception of radio waves is connected to the antenna cable 93.

The second receiver USB connector 25 is used for connection of a USB cable (wired cable) 8. Through the USB cable 8, the second receiver 22 can be connected by wire to the tablet 5 which will be described later. The USB cable 8 defines and functions as a data communication cable. The operator is able to confirm a state of the second receiver 22 via the tablet 5 connected to the second receiver 22. The operator is also able to provide various instructions to the second receiver 22 by operating the tablet 5.

The second receiver maintenance switch 26 is defined by a slide switch, for example. Sliding the second receiver maintenance switch 26 allows the second receiver 22 to be switched between two operation modes, namely, a normal mode and a maintenance mode. The normal mode of the second receiver 22 is an operation mode used in manually or automatically operating the stacker crane 12, and the maintenance mode thereof is an operation mode used in performing an initial setting and various settings.

Changing the operation mode by the second receiver maintenance switch 26 is enabled by once powering off the second receiver 22 and then powering on the second receiver 22 again.

As shown in FIG. 4, the second receiver 22 includes a second receiver wireless processor 28 and a second receiver safety processor 29. The second receiver wireless processor 28 and the second receiver safety processor 29, which are connected by a UART for example, perform serial communication. The UART is short for Universal Asynchronous Receiver/Transmitter.

The second receiver wireless processor 28, which is a computer (specifically, a wireless communication module), includes a CPU, a ROM, a RAM, and the like. The second receiver wireless processor 28 wirelessly communicates with the stationary remote controller 4 and with the portable remote controller 6.

The second receiver safety processor 29, which is a computer, includes a CPU, a ROM, a RAM, and the like. The second receiver safety processor 29 is provided as a function safety processor. To be specific, the second receiver safety processor 29 determines whether or not to shift to a safe state where the stacker crane 12 does not operates, based on a result of communication between the second receiver wireless processor 28 and the stationary remote controller 4 and between the second receiver wireless processor 28 and the portable remote controller 6. Then, if necessary, the second receiver safety processor 29 outputs a safe state request signal to the crane controller 2.

As shown in FIG. 3, the automated warehouse 1 of this preferred embodiment is provided with a control instruction transmitter 3 that enables the operator to provide instructions to the stacker crane 12. The control instruction transmitter 3 is able to perform wireless communication with the crane controller 2 via a wireless LAN for example, through the first receiver 21 and the second receiver 22. Upon the operator operating the control instruction transmitter 3, the control instruction transmitter 3 transmits an instruction in accordance with the operation, to the crane controller 2 through the first receiver 21 and the second receiver 22.

Figure 6:
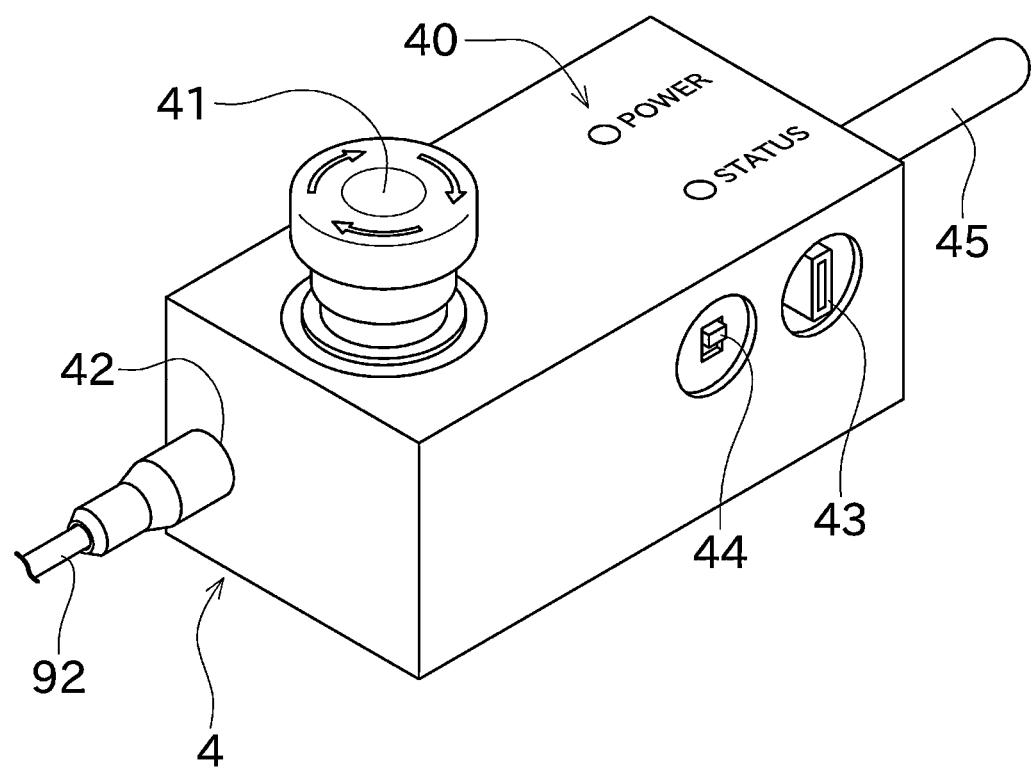
FIG. 6 is a perspective view showing a stationary remote controller.
Figure 7:
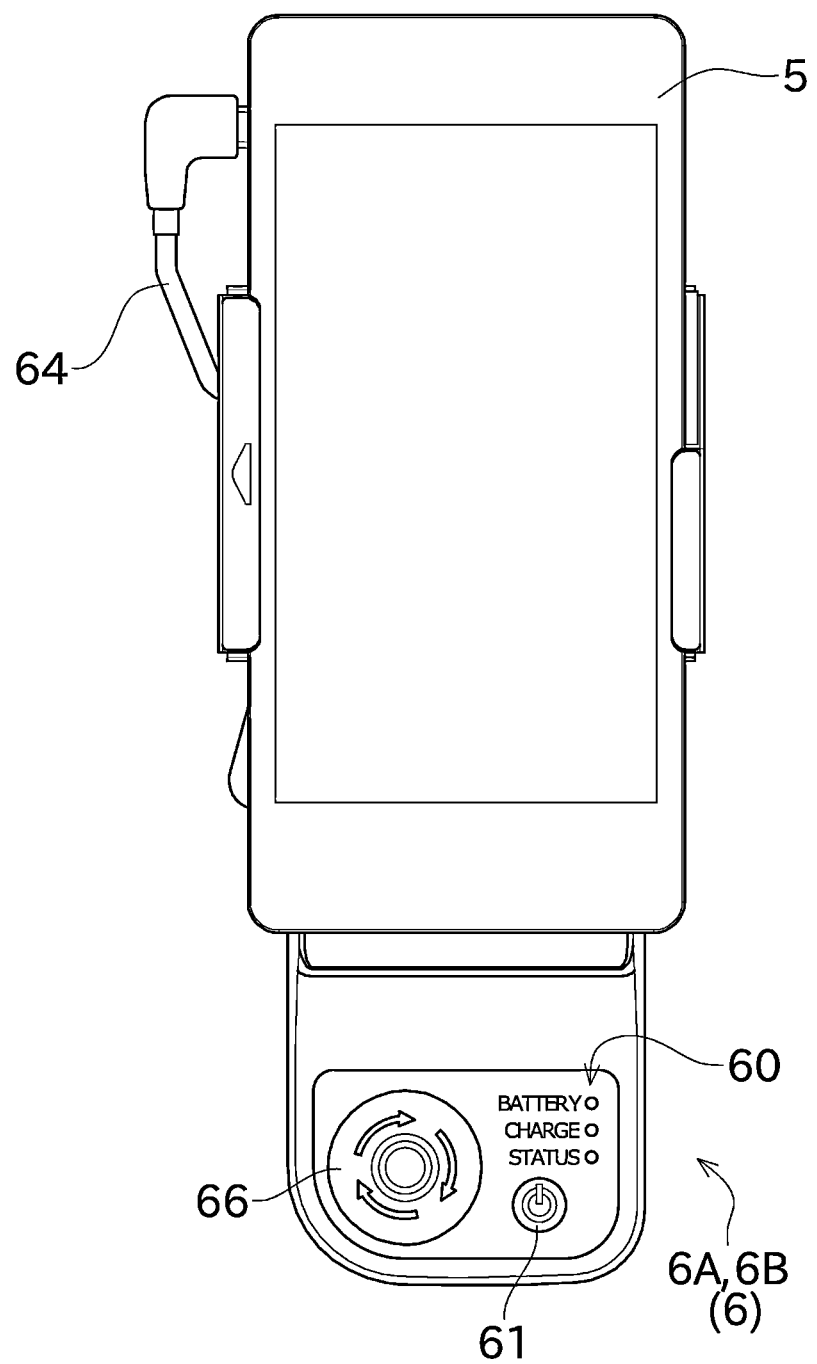
FIG. 7 is a front view of a portable remote controller to which a tablet attached.
Figure 8:
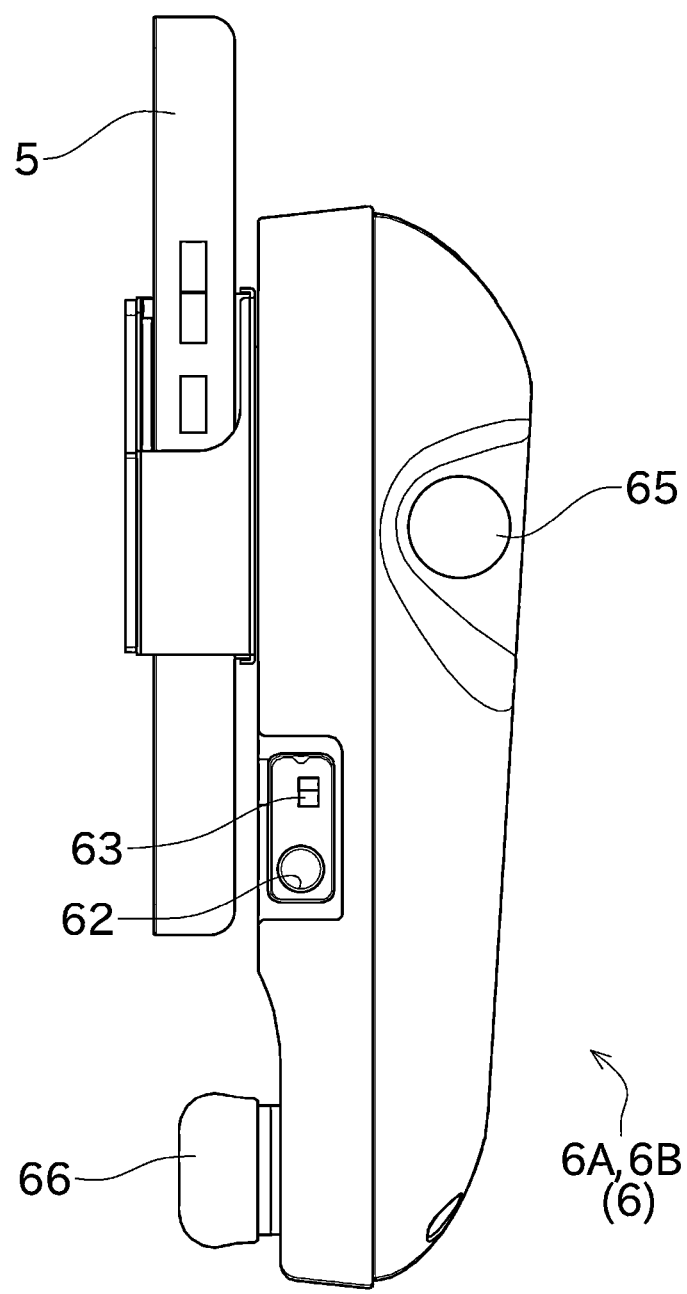
FIG. 8 is a side view of a portable remote controller to which a tablet attached.

The control instruction transmitter 3 includes the stationary remote controller 4 shown in FIG. 6, the tablet (portable terminal) 5, and the portable remote controller (transmitter) 6 shown in FIG. 7 and FIG. 8.

The stationary remote controller 4 is fixed at the outside of the fence 9, for example, so that the operator is able to operate the stationary remote controller 4 at a location outside the operation area of the automated warehouse 1. The stationary remote controller 4 is operated when the operation of the stacker crane 12 needs to be stopped promptly in a case of emergency.

As shown in FIG. 6, the stationary remote controller 4 includes a stationary remote controller state display 40, a stationary-side emergency stop switch 41, a stationary remote controller power connector 42, a stationary remote controller USB connector 43, a stationary remote controller maintenance switch 44, and a wireless antenna 45.

The stationary remote controller state display 40 includes two lamps, namely, a power indicator lamp and a status lamp. Each of the lamps is an LED. The stationary remote controller state display 40 indicates various operation states of the stationary remote controller 4 by combinations of lighting colors and lighting states (lighting or blinking) of the LEDs.

The stationary-side emergency stop switch 41 is defined by a push button switch. The stationary-side emergency stop switch 41 is located on a front surface of the stationary remote controller 4. The stationary-side emergency stop switch 41 is pressed when the stacker crane 12 needs to be stopped emergently. Once the stationary-side emergency stop switch 41 is pressed, the stationary-side emergency stop switch 41 is kept in the pressed state even after the operating force is removed therefrom. Rotating to the right or pulling the stationary-side emergency stop switch 41 releases the pressed state.

In a state where the stationary-side emergency stop switch 41 is pressed, the stationary remote controller 4 transmits, to the second receiver 22, an emergency stop signal that is a state signal indicating the emergency stop switch being on. In a state where the stationary-side emergency stop switch 41 is not pressed, the stationary remote controller 4 transmits, to the second receiver 22, a non-stop signal that is a state signal indicating the emergency stop switch being off.

A power cable 92 is connected to the stationary remote controller power connector 42. Through the power cable 92 connected to the stationary remote controller power connector 42, electric power necessary for operations of the stationary remote controller 4 is supplied. In the stationary remote controller 4 of this preferred embodiment, disconnecting the power cable 92 from an external power source or disconnecting the power cable 92 from the stationary remote controller power connector 42 causes the stationary remote controller 4 to be powered off. This however is not limiting and it may also be acceptable that the stationary remote controller 4 includes a power switch that enables switching power-on/power-off.

The stationary remote controller USB connector 43 is used to connect the USB cable 8. Through the USB cable 8, the stationary remote controller 4 can be connected by wire to the tablet 5. The operator is able to confirm a state of the stationary remote controller 4 via the tablet 5 connected to the stationary remote controller 4. The operator is also able to provide various instructions to the stationary remote controller 4 by operating the tablet 5.

The stationary remote controller maintenance switch 44 is defined by a slide switch, for example. Sliding the stationary remote controller maintenance switch 44 allows the stationary remote controller 4 to be switched between a normal mode and a maintenance mode. The normal mode of the stationary remote controller 4 is an operation mode in which the stacker crane 12 can be stopped emergently, and the maintenance mode thereof is an operation mode used in performing an initial setting and various settings. Changing the operation mode by the stationary remote controller maintenance switch 44 is enabled by once powering off the stationary remote controller 4 and then powering on the stationary remote controller 4 again.

The wireless antenna 45, which is a rod-shaped antenna, is able to perform transmission and reception of radio waves.

As shown in FIG. 4, the stationary remote controller 4 has a stationary remote controller wireless processor 46 and a stationary remote controller safety processor 47. The stationary remote controller wireless processor 46 and the stationary remote controller safety processor 47, which are connected by a UART for example, perform serial communication.

The stationary remote controller wireless processor 46, which is a computer (specifically, a wireless communication module), includes a CPU, a ROM, a RAM, and the like. The stationary remote controller wireless processor 46 wirelessly communicates with the second receiver wireless processor 28 included in the second receiver 22.

The stationary remote controller safety processor 47, which is a computer, includes a CPU, a ROM, a RAM, and the like. The stationary remote controller safety processor 47 is provided as a function safety processor. The stationary remote controller safety processor 47 is electrically connected to the stationary-side emergency stop switch 41. The stationary remote controller safety processor 47 outputs a state signal indicating a state of the stationary-side emergency stop switch 41 to the stationary remote controller wireless processor 46.

The tablet 5 is a known tablet type computer includes a CPU, a ROM, a RAM, and an input/output unit. The tablet 5 is provided with a touch panel display that integrates an operation interface operated by an operator and a display that displays various information.

The tablet 5, which has a built-in wireless antenna (not shown), is able to wirelessly communicate with the first receiver 21 as shown in FIG. 3. In accordance with an operation performed by the operator, the tablet 5 wirelessly transmits, to the first receiver 21, various types of instruction, for example, an instruction to switch the operation mode of the stacker crane 12 and an operation instruction to move the stacker crane 12 while the stacker crane 12 is in the manual operation mode.

The tablet 5 can be connected by wire to each of the stationary remote controller 4, the portable remote controller 6, and the second receiver 22 via a USB cable (for example, the USB cable 8 shown in FIG. 5). The tablet 5 is able to display various types of information on each of the above communication devices to which the tablet 5 is connected, and also able to output a control instruction for operating the communication device to the communication device. That is, by being connected to each communication device, the tablet 5 provides a man-machine interface for the communication device.

The portable remote controller 6 is used in combination with the tablet 5, to control operations of the stacker crane 12 while the stacker crane 12 is in the manual operation mode. The portable remote controller 6, which has a built-in wireless antenna (not shown), is able to wirelessly communicate with the second receiver 22 as shown in FIG. 3, etc.

Referring to FIG. 7 and FIG. 8, the portable remote controller 6 includes a portable remote controller state display 60, a power button 61, a remote controller power connector 62, a remote controller maintenance switch 63, a USB cable 64, an enable switch 65, and a portable-side emergency stop switch 66.

As shown in FIG. 7, the portable remote controller state display 60 includes three lamps, namely, a power indicator lamp, a charge lamp, and a status lamp. Each of the lamps is an LED. The portable remote controller state display 60 indicates various operation states of the portable remote controller 6 by combinations of lighting colors and lighting states (lighting or blinking) of the LEDs.

The power button 61 is a push button switch. Pressing the power button 61 can switch the presence or absence of electric power supply from a rechargeable battery (not shown) included in the portable remote controller 6. Accordingly, powering on/off the portable remote controller 6 is implemented.

A cable (not shown) to charge the rechargeable battery described above is able to be connected to the remote controller power connector 62.

The remote controller maintenance switch 63 is defined by a slide switch, for example. Sliding the remote controller maintenance switch 63 allows the portable remote controller 6 to be switched between two operation modes, namely, a normal mode and a maintenance mode. The normal mode of the portable remote controller 6 is an operation mode to operate the stacker crane 12 while the stacker crane 12 is in the manual operation mode. The maintenance mode thereof is an operation mode used in performing an initial setting and various settings. Changing the operation mode by the remote controller maintenance switch 63 is enabled by once powering off the portable remote controller 6 and then powering on the portable remote controller 6 again.

The USB cable 64 is extended from a housing of the portable remote controller 6. The USB cable 64, which is a data communication cable, can be connected to the tablet 5.

The enable switch 65 is defined by a push button switch, for example. The enable switch 65 is located at a side surface of the portable remote controller 6, and the operator is able to press the enable switch 65 while holding the portable remote controller 6 with one of his/her hand. While the stacker crane 12 is in the manual operation mode, pressing the enable switch 65 with a certain degree of operating force is required, in order to make the operator recognize that the operation of the stacker crane 12 is permitted. Even after being pressed, the enable switch 65 returns from the pressed state to its original state if the operating force is removed. Accordingly, in a case of the operator falling into an unexpected situation, for example, tumbling, the operation of the stacker crane 12 is able to be immediately set as unpermitted.

In a state where the enable switch 65 is pressed, the portable remote controller 6 transmits, to the second receiver 22, an enable signal that is a state signal indicating the enable switch being on. In a state where the enable switch 65 is not pressed, the portable remote controller 6 transmits, to the second receiver 22, a disable signal that is a state signal indicating the enable switch being off.

In this preferred embodiment, the enable switch 65 is a 3-position switch. In a case where the operator presses the enable switch 65 with a strong force as well as a case where the enable switch 65 is not pressed, the portable remote controller 6 transmits the disable signal to the second receiver 22. Accordingly, the operation of the stacker crane 12 is able to be stopped appropriately in a case of emergency, even though the operator keeps touching the enable switch 65 with his/her finger and rather strongly presses the enable switch 65 by reflex.

The portable-side emergency stop switch 66 is a push button switch, for example. The portable-side emergency stop switch 66 is located at a front surface of the portable remote controller 6. The portable-side emergency stop switch 66 is pressed when the stacker crane 12 needs to be stopped emergently while the stacker crane 12 is in the manual operation mode. Once the portable-side emergency stop switch 66 is pressed, the portable-side emergency stop switch 66 is kept in the pressed state even after the operating force is removed therefrom. Rotating or pulling the portable-side emergency stop switch 66 to the right releases the pressed state.

In a state where the portable-side emergency stop switch 66 is pressed, the portable remote controller 6 transmits, to the second receiver 22, an emergency stop signal that is a state signal indicating the emergency stop switch being on. In a state where the portable-side emergency stop switch 66 is not pressed, the portable remote controller 6 transmits, to the second receiver 22, a non-stop signal that is a state signal indicating the emergency stop switch being off.

As shown in FIG. 4, the portable remote controller 6 includes a portable remote controller wireless processor 67 and a portable remote controller safety processor 68. The portable remote controller wireless processor 67 and the portable remote controller safety processor 68, which are connected by a UART for example, perform serial communication.

The portable remote controller wireless processor 67, which is a computer (specifically, a wireless communication module), includes a CPU, a ROM, a RAM, and the like. The portable remote controller wireless processor 67 wirelessly communicates with the second receiver wireless processor 28 included in the second receiver 22.

The portable remote controller safety processor 68, which is a computer, includes a CPU, a ROM, a RAM, and the like. The portable remote controller safety processor 68 is provided as a function safety processor. The portable remote controller safety processor 68 is electrically connected to the enable switch 65 and the portable-side emergency stop switch 66. The portable remote controller safety processor 68 outputs a state signal indicating states of the enable switch 65 and the portable-side emergency stop switch 66 to the portable remote controller wireless processor 67.

As thus far described, the automated warehouse 1 of this preferred embodiment includes the safety signal system (wireless communication system) 20 separately from a transmission/reception system (the first receiver 21 and the tablet 5) to transmit and receive operation instructions to operate the stacker crane 12. The safety signal system (wireless communication system) 20 transmits and receives an enable signal that enables an operation instruction provided to the stacker crane 12 and an emergency stop signal that is provided in a case of emergency. The safety signal system 20 is defined by the second receiver 22, the stationary remote controller 4, and the portable remote controller 6, as shown in FIG. 4.

The safety signal system 20 allows an emergency stop signal, etc. to be transmitted to the second receiver 22 without delay, and in a case of emergency, can promptly and reliably stop the operation of the stacker crane 12.

In this preferred embodiment, the safety signal system performs wireless communication. This provides easy handling because there is no risk that the signal cable will be caught on a machine. In addition, the portable remote controller 6, and the like, can be lightened by a weight corresponding to the signal cable. Consequently, a burden on the operator can be reduced.

Due to the characteristics of wireless communication that do not need any physical coupling between communication devices with a signal cable and thus allow connection partners to be easily changed, it is difficult for the operator to intuitively recognize which communication device is in communication with a certain communication device.

Next, a registration operation of registering a permitted communication partner will be described below. This operation is necessary before the safety signal system 20 described above starts working.

Registering a permitted communication partner means that each of the stationary remote controller 4, the portable remote controller 6, and the second receiver 22 preliminarily registers identification information on a partner that is permitted to communicate with the stationary remote controller 4 itself, the portable remote controller 6 itself, or the second receiver 22 itself, the registration being made in a situation that allows the operator to confirm the registration.

Two communication devices, by mutually registering partner's identification information, are permitted to perform wireless communication to implement the safety signal system 20.

The identification information may be in any form, as long as it can uniquely identify the stationary remote controller 4, the portable remote controller 6 and the second receiver 22. In this preferred embodiment, information obtained by properly processing a MAC address is used as the identification information. Hereinafter, this identification information may be referred to as ID.

The registration operation of a permitted communication partner can be performed as follows, for example, when the second receiver 22 is registered as a permitted communication partner of the portable remote controller 6. (1) The ID of the second receiver 22 to be registered as a permitted communication partner of the portable remote controller 6 is input to the portable remote controller 6 by an appropriate method. (2) The portable remote controller 6 transmits the input ID to the second receiver 22 by wireless communication. (3) The second receiver 22 compares the received ID with the ID of the own device, and returns the result of the determination whether the IDs match or not to the portable remote controller 6. (4) When the portable remote controller 6 receives the determination result indicating that both IDs match, the portable remote controller 6 registers the ID of the second receiver 22 as the ID of the permitted communication partner, subject to a predetermined operation of the second receiver 22 by the operator.

The above work can be performed in substantially the same process to register the second receiver 22 as a permitted communication partner in the stationary remote controller 4. (1) The ID of the second receiver 22 to be registered as a permitted communication partner of the stationary remote controller 4 is input to the stationary remote controller 4 by an appropriate method. (2) The stationary remote controller 4 transmits the input ID to the second receiver 22 by wireless communication. (3) The second receiver 22 compares the received ID with the ID of the own device, and returns the result of the determination whether the IDs match or not to the stationary remote controller 4. (4) When the stationary remote controller 4 receives the determination result indicating that both IDs match, the portable stationary remote controller 4 registers the ID of the second receiver 22 as the ID of the permitted communication partner, subject to a predetermined operation of the second receiver 22 by the operator.

Thus, the registration operation of permitted communication partners includes the operation of testing the wireless communication.

Similar features apply when registering a portable remote controller 6 or a stationary remote controller 4 to the second receiver 22 as a permitted communication partner described above.

In this preferred embodiment, one portable remote controller 6 is allowed to register two or more second receivers 22 as permitted communication partners. Accordingly, the operator operating the one portable remote controller 6 is able to provide instructions while switching from one to another among the second receivers 22 that are registered as the communication partners. Accordingly, the versatility of the portable remote controller 6 can be increased.

One second receiver 22 is allowed to register two or more portable remote controllers 6 and two or more stationary remote controllers 4 as permitted communication partners. The operator operates any of the portable remote controllers 6 or the stationary remote controllers 4 that is established the wireless connection with the second receiver 22, and thus is able to provide instructions, for example, an instruction to stop the corresponding stacker crane 12.

One stationary remote controller 4 is allowed to register only one second receiver 22 as a permitted communication partner. Considering that the stationary remote controller 4 is fixedly installed unlike the portable remote controller 6, the stationary remote controller 4 is not allowed to change its communication partner, the second receiver 22. This can make the operation simple.

In order that the portable remote controller 6 or the second receiver 22 can register two or more permitted communication partners, the above-described registration operation is repeated with different communication devices as partners.

Next, the pairing state, which is a premise for wireless connection, will be described.

When an operator carrying the portable remote controller 6 wishes to move the stacker crane 12 in the manual operation mode, the operator operates the tablet 5 in the state attached to the portable remote controller 6 as shown in FIG. 7 to select the second receiver 22 corresponding to the stacker crane 12 as a connection partner. Accordingly, communication is appropriately performed between the portable remote controller 6 and the selected second receiver 22, and the second receiver 22 to which the portable remote controller 6 is connected (and thus the crane controller 2 of the stacker crane 12 to be operated) is determined.

The state in which the connection partner of one portable remote controller 6 is fixed to one second receiver 22 is a state in which a one-to-one pair is provided, and is a pairing state (partner fixed state). The aforementioned permitted communication partner can also be referred to as a candidate (pairing candidate) for the partner to be in a pairing state. Two or more handheld remote controllers 6 cannot be in a pairing state simultaneously for one second receiver 22.

In order to be in a pairing state, it is necessary that the second receiver 22 is pre-registered as a permitted connection partner in the portable remote controller 6 and that the portable remote controller 6 is pre-registered as a permitted communication partner connection partner in the second receiver 22 of the connection partner. After the pairing state, the wireless connection between the portable remote controller 6 and the second receiver 22 is immediately established.

The pairing state is a concept used to limit a partner who can establish the wireless connection. In the pairing state, the portable remote controller 6 that can operate the second receiver 22 is only one portable remote controller 6 which is the communication partner of the second receiver 22 (in other words, only one portable remote controller 6 which is the pair of the second receiver 22). Accordingly, no other portable remote controller 6 can be connected to the second receiver 22. Accordingly, an unstable situation is able to be avoided in which multiple persons can operate the same stacker crane 12 at the same time.

When the operation of the stacker crane 12 by the tablet 5 and the portable remote controller 6 is finished, the operator operates the tablet 5 to instruct the portable remote controller 6 to disconnect the wireless connection. As a result, the communication between the portable remote controller 6 and the second receiver 22 is performed accordingly, the wireless connection is disconnected, and the pairing state is released at about the same time.

Next, a case that the wireless connection, which is once established, is disconnected without an instruction of the operator will be described.

Even if the portable remote controller 6 and the second receiver 22 are in the pairing state and the wireless connection is established, there may be a case in which the wireless connection cannot be maintained thereafter due to, for example, radio wave conditions. In this preferred embodiment, even if the wireless connection between the portable remote controller 6 and the second receiver 22 is no longer possible, the pairing state is continued. Even if the wireless connection is unintentionally disconnected, the situation where the portable remote controller 6 is the only one that can operate the second receiver 22 will continue. Unless the operator performs an operation to forcibly release the pairing state (hereinafter referred to as a forced release operation), a situation where the portable remote controller 6 is the only one that can operate the second receiver 22 is maintained. Accordingly, appropriately functional safety requirements are able to be met. The details of the forced release operation are described below.

Although the wireless connection cannot be performed, the pairing state is continued as described above. In this preferred embodiment, the wireless connection is not automatically re-established even if the wireless connection is restored to a connectable state. The following three examples, (a) to (c), are described below.

(a) After the portable remote controller 6 and the second receiver 22 are in the pairing state and the wireless connection is established, the power of the portable remote controller 6 is turned off and the wireless connection is disconnected. The reason for the power of the portable remote controller 6 to be turned off may be, for example, that the power button of the portable remote controller 6 is operated, or that the remaining capacity of the rechargeable battery is reduced. In this case, even if the power of the portable remote controller 6 is subsequently turned on, the wireless connection between the portable remote controller 6 and the second receiver 22 is not automatically re-established. In order to re-establish the wireless connection, the operator needs to turn the power of the second receiver 22 off and then turn it on once, in addition to turning on the power of the portable remote controller 6.

(b) After the portable remote controller 6 and the second receiver 22 are in the pairing state and the wireless connection is established, the power of the second receiver 22 is turned off and the wireless connection is disconnected. The reason for the power of the second receiver 22 to be turned off may be, for example, that the power source of the stacker crane 12 that supplies power to the second receiver 22 is turned off. In this case, even if the power of the second receiver 22 is subsequently turned on, the wireless connection between the portable remote controller 6 and the second receiver 22 is not automatically re-established. In order to re-establish the wireless connection, the operator needs to turn the power of the portable remote controller 6 off and then turn it on, in addition to turning on the power of the second receiver 22.

(c) After the portable remote controller 6 and the second receiver 22 are in the pairing state and a wireless connection is established, the wireless connection is disconnected due to deterioration of the radio wave conditions or the like. In this case, even if the radio wave conditions return to normal, the wireless connection is not re-established between the portable remote controller 6 and the second receiver 22. In order to re-establish the wireless connection, the operator needs to turn the power of the second receiver 22 off and then turn it on, and also turn the power of the portable remote controller 6 off and then turn it on.

Thus, in this preferred embodiment, when the wireless connection between the portable remote controller 6 and the second receiver 22, which is established after pairing, cannot be maintained as described in (a) to (c) above before disconnection by a normal operation, the operator is required to perform the predetermined operation to not one device but both of the portable remote controller 6 and the second receiver 22 in order to re-establish the wireless connection. The required operation of the operator is specifically turning the power on (however, if the power is already on, it is required to turn the power off and then turn it on).

This will make the operator again aware of the relationship between the portable remote controller 6 and the second receiver 22 before starting the wireless connection again. Accordingly, the stacker crane 12 is able to be prevented from being moved by the operation of the portable remote controller 6 even though the operator does not intend to do so.

First, with reference to FIG. 9, the processes performed in the second receiver 22 will be described below.

Figure 9:
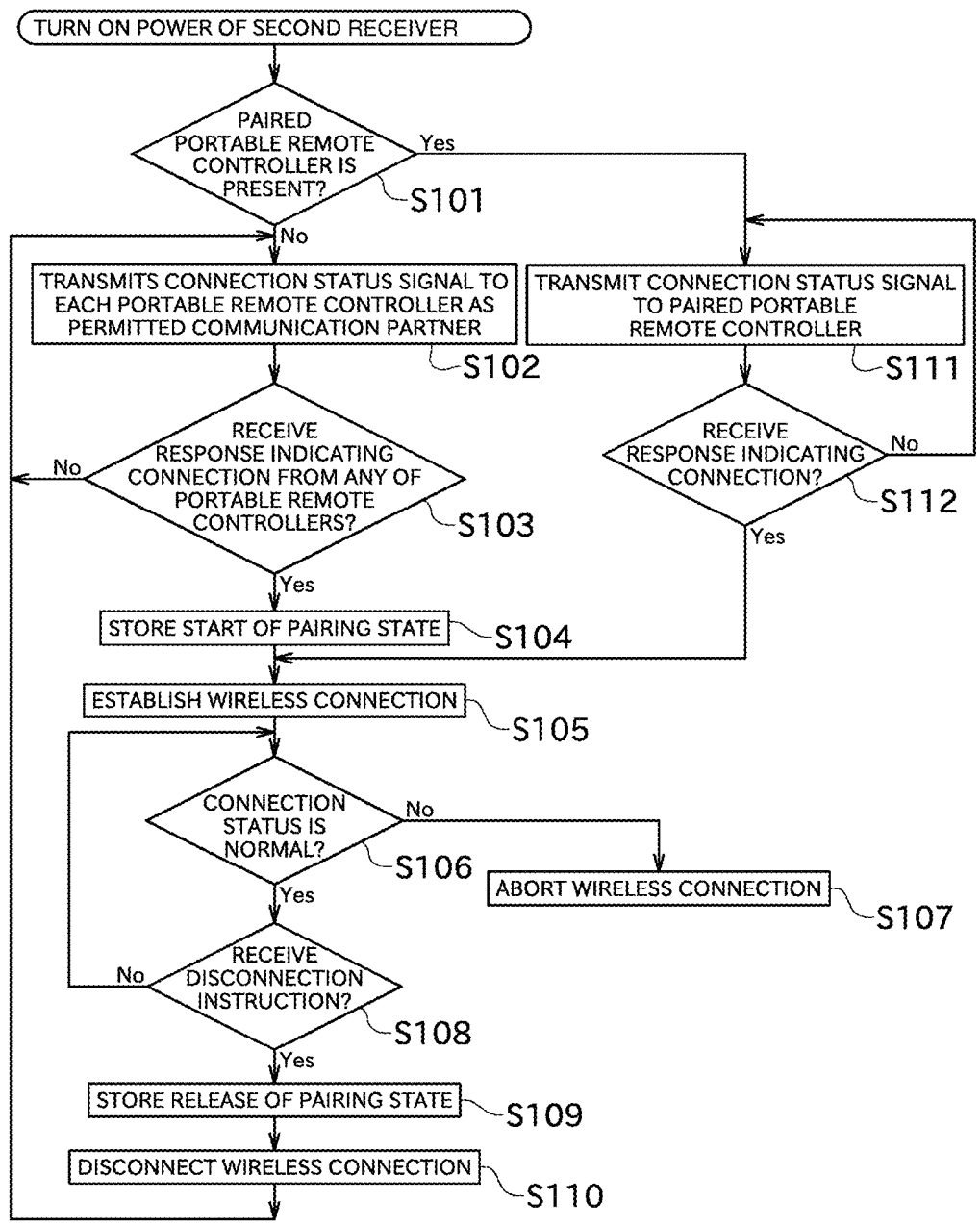
FIG. 9 is a flowchart showing processes performed in a second receiver.

The flows of FIG. 9 are started by turning the power of the second receiver 22 from off to on. First, the second receiver 22 determines whether the portable remote controller 6 which is already in the pairing state with the second receiver 22 is present or not (step S101). In the following description, a state where pairing is already started and the devices are in the pairing state may be referred to as paired. The determination of the step S101 can be performed based on the contents of the pairing information stored in the non-volatile memory provided by the second receiver 22.

As a result of the determination of the step S101, the paired portable remote controller 6 is not present, the second receiver 22 sequentially transmits a connection status signal to each of the portable remote controllers 6 registered in the second receiver 22 as a permitted communication partner beforehand (step S102). The connection status signal includes information indicating the current status of the connection with the second receiver 22 (specifically, whether the connection to the second receiver 22 is possible or not, etc.).

The second receiver 22 determines whether a response indicating the connection from the portable remote controller 6 to which the connection status signal is transmitted (step S103). If the response indicating the connection is not received from any of the portable remote controllers 6, the second receiver 22 returns to step S102 and repeats the transmission of the connection status signal.

If the response indicating the connection is received from one of the portable remote controllers 6 in the determination of step S103, the second receiver 22 writes the start of the pairing state and the ID of the paired portable remote controller 6 as pairing information in the non-volatile memory provided by the second receiver 22. (Step S104) Thereafter, the second receiver 22 establishes the wireless connection with the portable remote controller 6 (step S105).

After the wireless connection is established, the second receiver 22 periodically transmits the status confirmation signal to the portable remote controller 6 of the connection partner and determines whether the connection status is normal or not by checking the response from the portable remote controller 6 (step S106). If the connection status is not normal, the second receiver 22 aborts the wireless connection (step S107).

If the second receiver 22 determines that the connection state is normal in the step S106, the second receiver 22 determines whether a disconnection instruction is received from the portable remote controller 6 of the connection partner (step S108). If the second receiver 22 receives the disconnection instruction, the second receiver 22 writes a release of the pairing state as pairing information in the non-volatile memory (step S109), and disconnects the wireless connection (step S110). Thereafter, the second receiver 22 perform the process of the step S102 described above.

In a loop consisting of the step S106 and the step S108 and in a state where the wireless connection is aborted in the step S107, not shown in the flowchart of FIG. 9, the second receiver 22 repeatedly and sequentially transmits the connection status signal to the other portable remote controller 6. However, since the pairing state is already started, the portable remote controller 6 other than the paired portable remote controller 6 cannot be connected to the second receiver 22. In the following, when the paired portable remote controller 6 with the second receiver 22 is present, the other portable remote controller 6 may be referred to as an unpaired portable remote controller 6. If the unpaired portable remote controller 6 tries to connect to the second receiver 22, the second receiver 22 rejects the connection.

When the second receiver 22 transmits the connection status signal to the unpaired portable remote controller 6, the second receiver 22 includes information indicating the presence of the paired portable remote controller 6 in the signal. Accordingly, even if the operator instructs the unpaired portable remote controller 6 to connect to the second receiver 22 by the tablet 5, the portable remote controller 6 can determine, by the connection status signal received from the second receiver 22, that the connection is not possible because the portable remote controller 6 is not paired.

As a result of the determination of the step S101 above, if the paired portable remote controller 6 is present, the second receiver 22 transmits the connection status signal to the portable remote controller 6 that is the partner of the pairing (step S111).

In the explanation from step S106 to step S108, the second receiver 22 repeatedly and sequentially transmits the connection status signal to the unpaired portable remote controller 6, and the process is performed in step S111 as well. The unpaired portable remote controller 6 is transmitted the connection status signal including information indicating the presence of the paired portable remote controller 6. Therefore, only the paired portable remote controller 6 can establish the wireless connection to the second receiver 22.

The second receiver 22 determines whether the response to connect is received from the paired portable remote controller 6 (step S112). If the second receiver 22 does not received the response indicating the connection from the portable remote controller 6, the second receiver 22 perform the step S111 and repeats the transmission of the connection status signal.

In the determination of step S112, when the second receiver 22 receives the response to connect from the paired portable remote controller 6, the wireless connection is re-established with the portable remote controller 6 (step S105). The subsequent processes are the same as or similar to the processes described above.

Next, with reference to FIG. 10, processes performed in the portable remote controller 6 will be described below.

Figure 10:
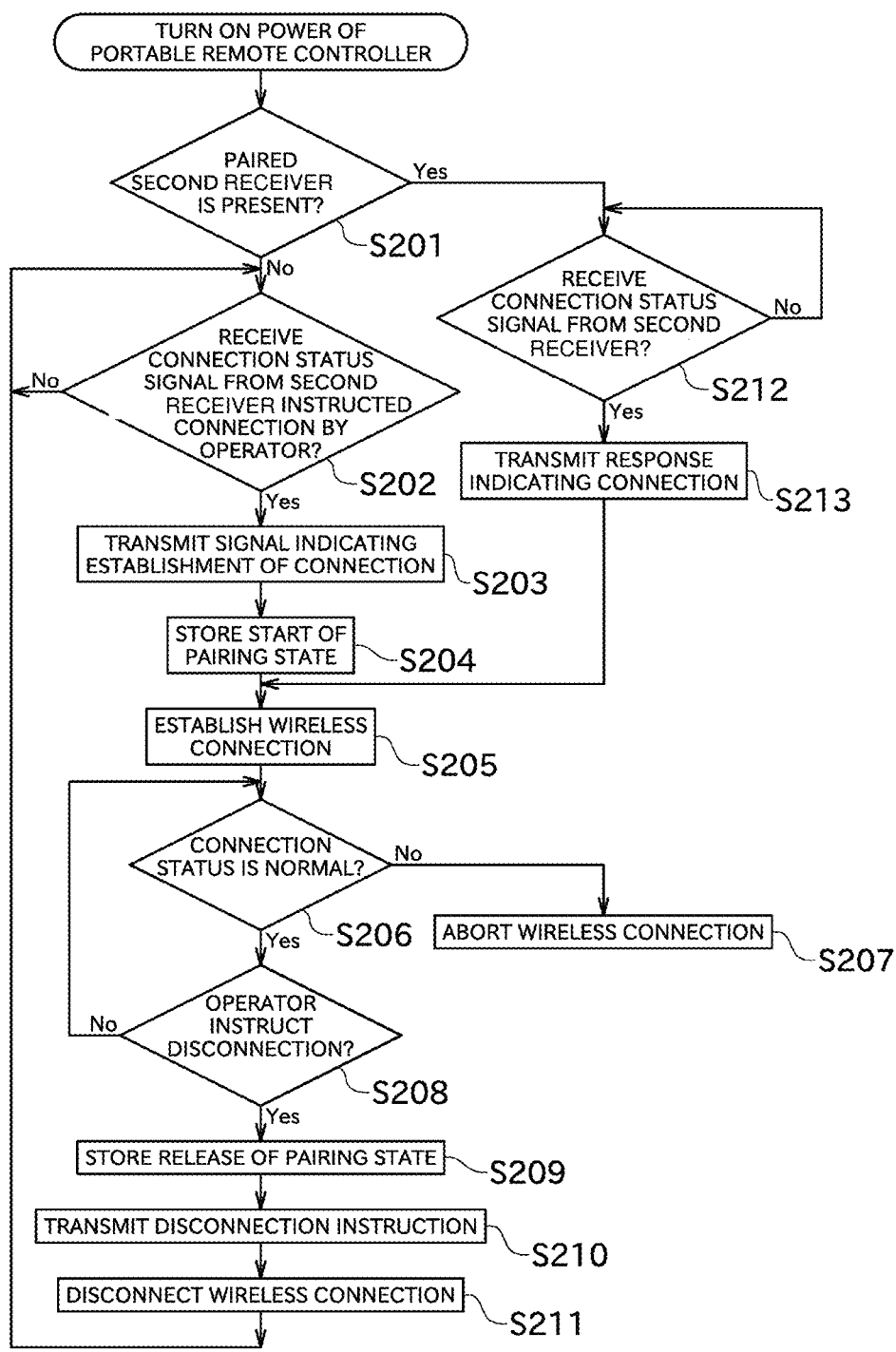
FIG. 10 is a flowchart showing processes performed in a portable remote controller.

The flows of FIG. 10 are started by turning the power of the portable remote controller 6 from off to on. The tablet 5 is attached to the portable remote controller 6 beforehand, and the portable remote controller 6 is connected to the tablet 5 by the USB cable 64. First, the portable remote controller 6 determines whether the paired second receiver 22 with the portable remote controller 6 is present or not (step S201). The determination of the step S201 can be based on the contents of the pairing information stored in the non-volatile memory provided by the portable remote controller 6.

As a result of the determination of the step S201, when the paired second receiver 22 is not present, the portable remote controller 6 determines whether the portable remote controller 6 received the connection status signal from the second receiver 22 or not, which is registered as the permitted communication partner of the portable remote controller 6, to instruct the connection based on the operation of the operator to the tablet 5 (step S202). If the operator does not instruct the connection to the second receiver 22 or the portable remote controller 6 does not receive the connection status signal from the second receiver 22 to instruct the connection of the operator, the determination of step S202 is repeated.

Even if the portable remote controller 6 receives the connection status signal from the second receiver 22 to instruct the connection of the operator, the connection status signal includes information indicating that the second receiver 22 and the other portable remote controller 6 may be already paired. In this case, the portable remote controller 6 displays an error on the tablet 5 that the connection to the indicated second receiver 22 cannot be performed and repeats the determination of step S202.

In the determination of the step S202, if the portable remote controller 6 receives the connection status signal from the second receiver 22 to instruct the connection of the operator, the portable remote controller 6 transmits a signal to establish the connection as a response to the connection status signal (step S203).

Thereafter, the portable remote controller 6 writes the start of the pairing state and the ID of the paired second receiver 22 as pairing information in the non-volatile memory (step S204). Thereafter, the portable remote controller 6 establishes a wireless connection with the second receiver 22 (step S205).

After the wireless connection is established, the portable remote controller 6 determines whether the connection state is normal or not by checking whether the portable remote controller 6 periodically receives the status confirmation signal from the second receiver 22 of the connection partner (step S206). When the portable remote controller 6 receives the status confirmation signal, the portable remote controller 6 immediately transmits a response to the second receiver 22. If the connection state is not normal, the portable remote controller 6 aborts the wireless connection (step S207).

If the connection state is determined to be normal in the determination of the step S206, the portable remote controller 6 determines whether the operator instructs to disconnect through the tablet 5 connected to the portable remote controller 6 (step S208). If the portable remote controller 6 receives the disconnection instruction, the portable remote controller 6 writes a release of the pairing state as pairing information in the non-volatile memory as pairing information (step S209), transmits the disconnect instruction as a response to the status confirmation signal (step S210), and disconnects the wireless connection (step S211). Thereafter, the portable remote controller 6 perform the process of the step S202 described above.

As a result of the determination of step S201 described above, the paired second receiver 22 is present, the portable remote controller 6 determines whether the connection status signal is received from the paired second receiver 22 (step S212). If the connection status signal is not received from the paired second receiver 22, the determination of the step S212 is repeated.

In the determination of the step S212, the connection status signal is received from the paired second receiver 22, the portable remote controller 6 transmits a response to the connection status signal indicating the connection (step S213). Thereafter, the wireless connection is re-established with the second receiver 22 (step S205). The subsequent processes are the same as or similar to the processes described above.

Next, how pairing and wireless connection is performed will be described below with reference to FIG. 11 to FIG. 13.

Figure 11:
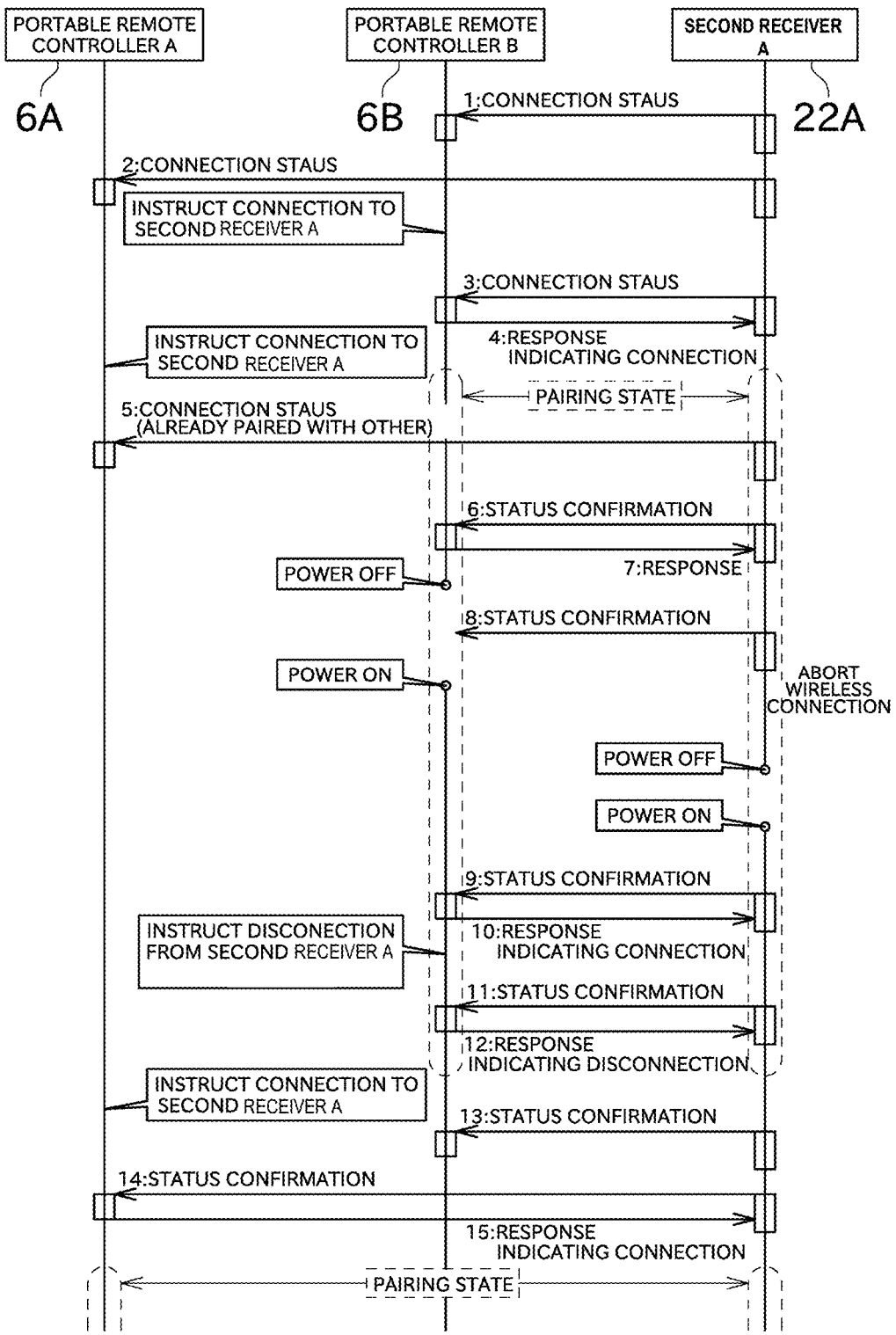
FIG. 11 is a sequence diagram showing re-establishment of wireless connection when power of a portable remote controller is turned off after wireless connection is established.

FIG. 11 shows that the operation of two portable remote controllers 6A, 6B, and a second receiver 22 which are communication devices provided to control the stacker crane 12 in the manual operation mode.

The second receiver 22A is registered as a permitted communication partner beforehand in the portable remote controllers 6A. The second receiver 22A is also registered similar to a permitted communication partner beforehand in the two portable remote controllers 6B. The two portable remote controllers 6A, 6B are registered as a permitted communication partner beforehand in the second receiver 22A.

The tablet 5 is attached to the portable remote controller 6A, 6B, respectively, as shown in FIG. 7, and is electrically connected by the USB cable 64. When the operator inputs various instructions to the portable remote controller 6A, 6B, the instructions are provided by operating the tablet 5.

In the sequence diagram of FIG. 11, first, the power of the two portable remote controllers 6A, 6B and one second receiver 22A is turned on, respectively.

At this point, the two portable remote controllers 6A, 6B are not in the pairing state with the second receiver 22A. Accordingly, the second receiver 22A repeatedly transmits the connection status signal to each of the portable remote controllers 6A, 6B, which are the permitted communication partners (sequence numbers 1 to 3, step S102).

The operator operates the portable remote controller 6B and instructs it to connect to the second receiver 22A at some point. As a result, the portable remote controller 6B transmits a response to the connection status signal from the second receiver 22A indicating the connection (sequence number 4, step S203). Thereafter, the second receiver 22A writes the start of the pairing state with the portable remote controller 6B to the non-volatile memory (step S104), and the portable remote controller 6B writes the start of the pairing state with the second receiver 22A to the non-volatile memory (step S204). Accordingly, the pairing state starts in each of the portable remote controller 6B and the second receiver 22A. The wireless connection is then immediately established (step S105, step S205).

After the pairing state with the portable remote controller 6B is started, the second receiver 22 transmits the connection status signal including the fact that another portable remote controller 6B is already paired to the unpaired portable remote controller 6A (sequence number 5). Accordingly, as shown in FIG. 11, even if another operator operates the portable remote controller 6A and instructs the portable remote controller 6A to connect to the second receiver 22A, the portable remote controller 6A receiving the connection status signal of sequence number 5 output an error indicating that the connection cannot be performed.

The second receiver 22A transmits the status confirmation signal after establishing the wireless connection with the portable remote controller 6B (sequence number 6). The portable remote controller 6B, which received the status confirmation signal, transmits a response to the second receiver 22A (sequence number 7). As a result, the second receiver 22A and the portable remote controller 6B monitors whether the connection state is normal or not (step S106, step S206).

Then, the power supply of the portable remote controller 6B is suddenly turned off, for example, due to a low level of the capacity of the rechargeable battery. The second receiver 22A transmits the status confirmation signal (sequence number 8), but the portable remote controller 6B cannot transmit a response. Since the second receiver 22A cannot receive the response from the portable remote controller 6B, the second receiver 22A determines that the connection is not normal and aborts the wireless connection (step S107).

The operator then replaces the rechargeable battery in the portable remote controller 6B and turns the power on again. The determination of the step S201 is performed by the portable remote controller 6B, and the non-volatile memory of the portable remote controller 6B stores that the pairing state with the second receiver 22A is started. Accordingly, the portable remote controller 6B waits until the connection status signal from the paired second receiver 22A is received (step S212).

However, the wireless connection is aborted in the second receiver 22A in the step S107. In the state, the connection status signal is not transmitted from the second receiver 22A to the portable remote controller 6B. That is, only turning on the power of the portable remote controller 6B does not automatically enable the wireless connection between the portable remote controller 6B and the second receiver 22A to be re-establish.

The operator then turns the power of the second receiver 22A off and on again. The decision of the step S101 is performed in the second receiver 22A, and the non-volatile memory of the second receiver 22A stores that the pairing state with the portable remote controller 6B is started. Accordingly, the second receiver 22A transmits the connection status signal to the paired portable remote controller 6B (sequence number 9, step S111). When the portable remote controller 6B receives the connection status signal from the paired second receiver 22A, the portable remote controller 6b transmits a response indicating the connection (sequence number 10, step S212). As a result, the wireless connection is re-established between the portable remote controller 6B and the second receiver 22A (step S105, step S205).

Next, another operator instructs the portable remote controller 6B to connect to the second receiver 22A. The portable remote controller 6B stores that the pairing state is released in the non-volatile memory (step S209). Further, the portable remote controller 6B transmits a response to the status confirmation signal transmitted by the second receiver 22A (sequence number 11) indicating the disconnection (sequence number 12, step S210). Upon receiving the response, the second receiver 22A stores the release of the pairing state in the non-volatile memory (step S109). As a result of the above, the pairing state is released in each of the portable remote controller 6B and the second receiver 22A. Then, the wireless connection is disconnected (step S110, step S211).

The second receiver 22A transmits the connection status signal including the fact that the second receiver 22A is already paired with another portable remote controller 6B to the unpaired portable remote controller 6A from the start of the pairing state with the portable remote controller 6B until the release of the pairing state. The connection status signal is repeatedly transmitted to the portable remote controller 6A not only sequence number 5, but until the pairing state between the portable remote controller 6B and the second receiver 22A is released, except during the power-off period of the second receiver 22A. Accordingly, even when the wireless connection is disconnected between the portable remote controller 6B and the second receiver 22A, the unpaired portable remote controller 6A cannot establish the wireless connection with the second receiver 22A as long as the pairing state between the two devices is continued.

After the pairing state between the portable remote controller 6B and the second receiver 22A is released as described above, the second receiver 22A repeatedly transmits the connection status signal to each of the portable remote controls 6A, 6B, which are the permitted communication partners, similar to sequence numbers 1-3 (sequence numbers 13 and 14, step S102). When the operator operates the portable remote controller 6A to instruct the second receiver 22A to connect, the portable remote controller 6A transmits a response to the connection status signal from the second receiver 22A indicating the connection (sequence number 15, step S203). Thereafter, the pairing state between the portable remote controller 6A and the second receiver 22A is started and a wireless connection thereof is established. Since the processing at this time is substantially the same as in the case of sequence number 4, the explanation is omitted.

The sequence diagram in FIG. 11 shows the case (a) above in re-establishing the wireless connection. Next, referring to FIG. 12, the case (b) above in the re-establishment of the wireless connection is described.

Figure 12:
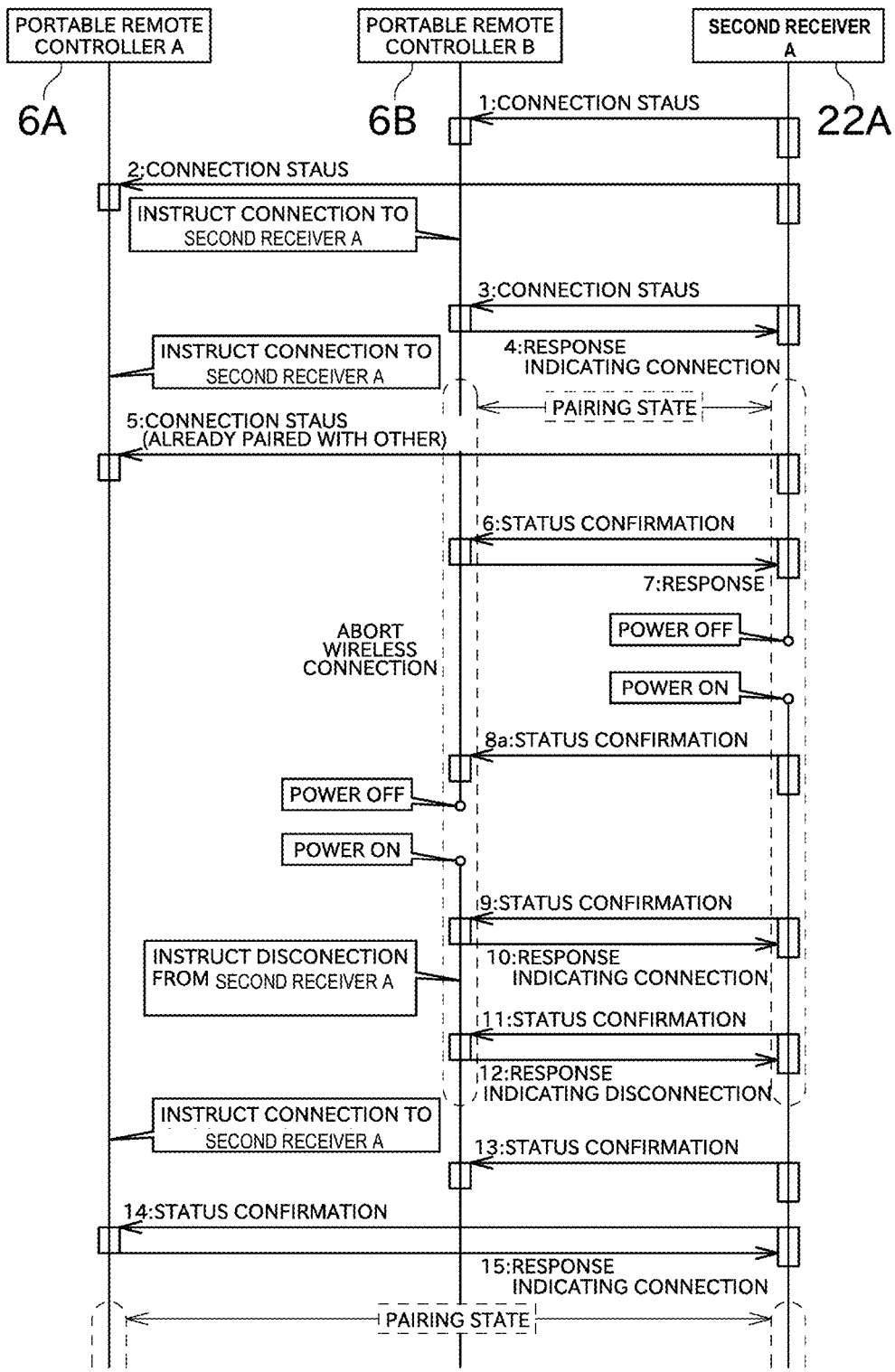
FIG. 12 is a sequence diagram showing re-establishment of wireless connection when power of a second receiver is turned off after wireless connection is established.

In FIG. 12, the processes up to sequence number 7 are the same as in FIG. 11. Then, instead of the power of the portable remote controller 6B being turned off as shown in FIG. 11, the power of the second receiver 22A is turned off for some reason.

The portable remote controller 6B cannot receive the status confirmation signal from the second receiver 22A even after waiting for a predetermined time during the power of the second receiver 22A is turned off. Accordingly, the portable remote controller 6B determines that the connection state is not normal and aborts the wireless connection (step S206 and step S207).

Then, the power of the second receiver 22A is turned on. The second receiver 22A transmits the connection status signal to the paired portable remote controller 6B (sequence number 8a, step S111). However, in the portable remote controller 6B, the wireless connection is already aborted in the step S207. In this state, the portable remote controller 6B does not respond even if the portable remote controller 6b receives the connection status signal from the second receiver 22A. That is, only turning on the power of the second receiver 22A does not automatically re-establish the wireless connection between the portable remote controller 6B and the second receiver 22A.

The operator then turns off the power of the portable remote controller 6B and turns it on again. Thereafter, if the portable remote controller 6B receives the connection status signal from the paired second receiver 22A as in sequence number 9, the portable remote controller 6B transmits a response indicating the connection (sequence number 10, step S213). As a result, the wireless connection is re-established between the portable remote controller 6B and the second receiver 22A (step S105, step S205). Since the sequence diagram after that is the same as that in FIG. 11, the explanation is omitted.

Figure 13:
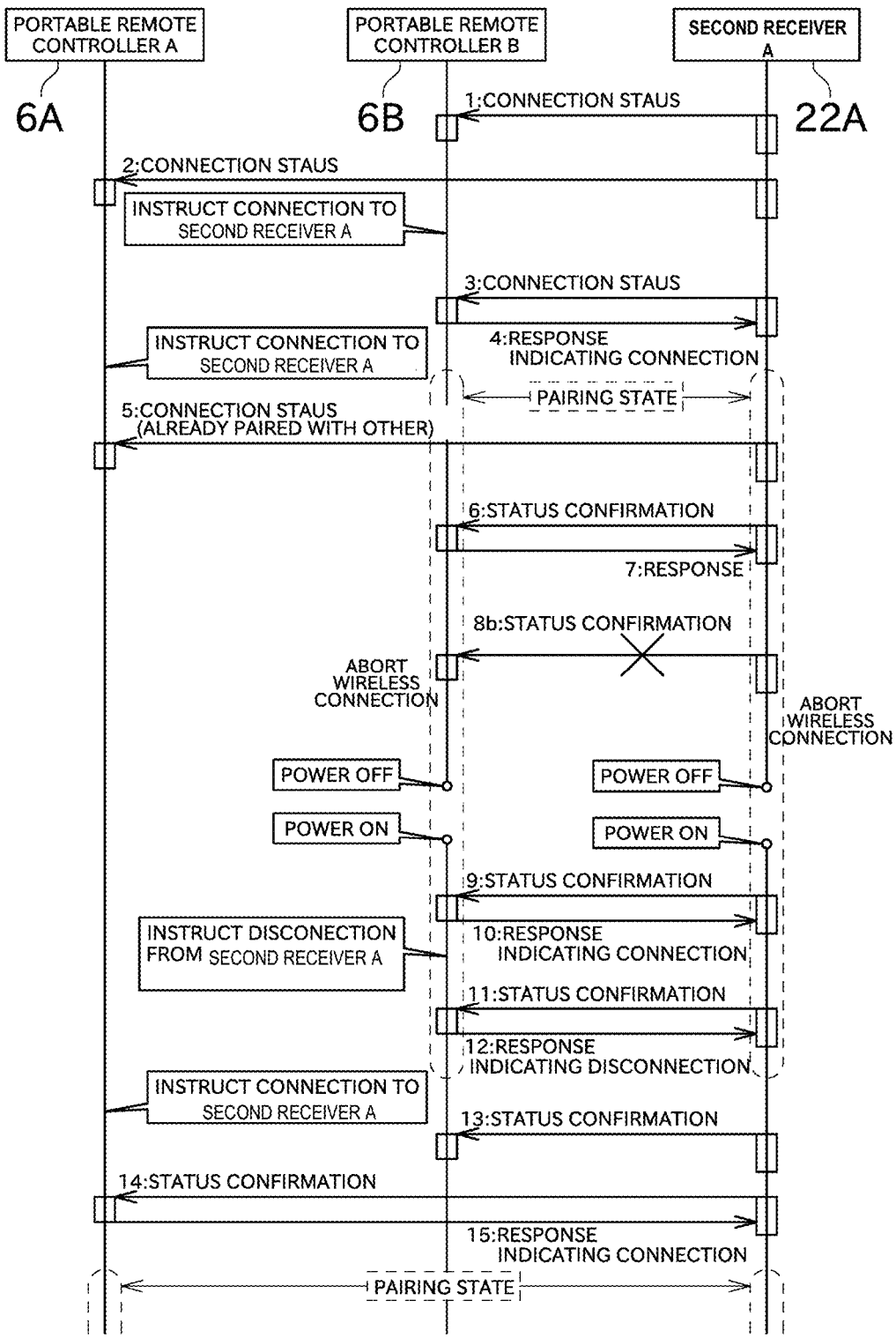
FIG. 13 is a sequence diagram showing re-establishment of wireless connection in a case where radio waves do not reach between a portable remote controller and a second receiver after wireless connection is established.

Next, referring to FIG. 13, the case (c) above in the re-establishment of the wireless connection is described.

In FIG. 13, the processes up to sequence number 7 are the same as in FIG. 11. Then, the second receiver 22A transmits the status confirmation signal (sequence number 8b), but the portable remote controller 6B cannot receive the status confirmation signal due to deterioration of the radio wave conditions.

The portable remote controller 6B cannot receive the status confirmation signal from the second receiver 22A even after waiting for a predetermined time. Accordingly, the portable remote controller 6B determines that the connection state is not normal and aborts the wireless connection (step S206 and step S207).

Since the portable remote controller 6B does not receive the status confirmation signal from the second receiver 22A, the portable remote controller 6B does not transmit a response to the second receiver 22A. Accordingly, since the second receiver 22A cannot receive the response from the portable remote controller 6B even after waiting for a predetermined time, the second receiver 22A determines that the connection is not normal and aborts the wireless connection (step S106, step S107).

Thereafter, the operator turns off and then turns on again the power of both the portable remote controller 6B and the second receiver 22A.

Then, the second receiver 22A transmits the connection status signal to the paired portable remote controller 6B (sequence number 9, step S111). In response, the portable remote controller 6B sends a response indicating the connection (sequence number 10, step S213). As a result, the wireless connection is re-established between the portable remote controller 6B and the second receiver 22A (step S105, step S205). Since the sequence diagram after that is the same as that in FIG. 11, the explanation is omitted.

Either of the portable remote controller 6B and the second receiver 22A may be turned on/off first by the operator. However, the wireless connection is not re-established unless the power is operated for both, not just one, of the portable remote controller 6B and the second receiver 22A. That is, if the power of the second receiver 22A is turned off and not turned on, the second receiver 22A remains in the state of aborted wireless connection and does not transmit the connection status signal to the portable remote controller 6B. If the power of the portable remote controller 6B is turned off and not turned on, the portable remote controller 6B remains in the state of aborted wireless connection and does not respond even if the portable remote controller 6B receives the connection status signal from the second receiver 22A.

Each of the cases (a) to (c) in which the wireless connection is irregularly disconnected are described above. In all cases, the wireless connection is able to be re-established by turning on the power or turning it off and then on for not one but both of the portable remote controller 6B and the second receiver 22A.

In other words, operation on both the portable remote controller 6B and the second receiver 22A is required to re-establish the wireless connection. Therefore, the operator re-establishes the wireless connection while being aware of the two communication devices, rather than aimlessly. As a result, the operator can clearly distinguish and recognize a situation in which the stacker crane 12 cannot move even if the portable remote controller 6 is operated or another situation in which the stacker crane 12 can move.

Next, the forced release of the pairing state will be described.

The following situation may occur. That is, the pairing state between the portable remote controller 6B and the second receiver 22A starts. Then, the wireless connection abruptly disconnects due to a failure of the portable remote controller 6B, for example. This cause the portable remote controller 6B not to be able to be turned on. In this situation, since the portable remote controller 6B is in the failure, the pairing state between the portable remote controller 6B and the second receiver 22A cannot be released. Since the pairing state between the portable remote controller 6B and the second receiver 22A is continued, the unpaired portable remote controller 6A cannot also be connected to the second receiver 22A. Thus, the stacker crane 12 is no longer able to be controlled at all by the safety signal system 20.

The safety signal system 20 of this preferred embodiment has a function to force the pairing state to be released by a special operation in consideration of the above situation. The operation to implement this function (the forced release operation described above) will be described.

The operator connects the tablet 5 to the second receiver 22A with the USB cable 8 as shown in FIG. 7, make the tablet execute a maintenance tool program pre-installed in the tablet 5 in a state where the second receiver 22A is in the maintenance mode.

When the program is executed on the tablet 5, password authentication is requested. If the operator successfully authenticates by entering the predetermined password into the tablet 5, the operator is able to use the various functions of the program.

The operator operates the tablet 5 accordingly and provides an instruction to display information about pairing of the second receiver 22A. In response, the tablet 5 receives the pairing information stored in the volatile memory of the second receiver 22A from the second receiver 22A and displays it on the display. The exchange of information at this time is performed by data communication through the USB cable 8.

Figure 14:
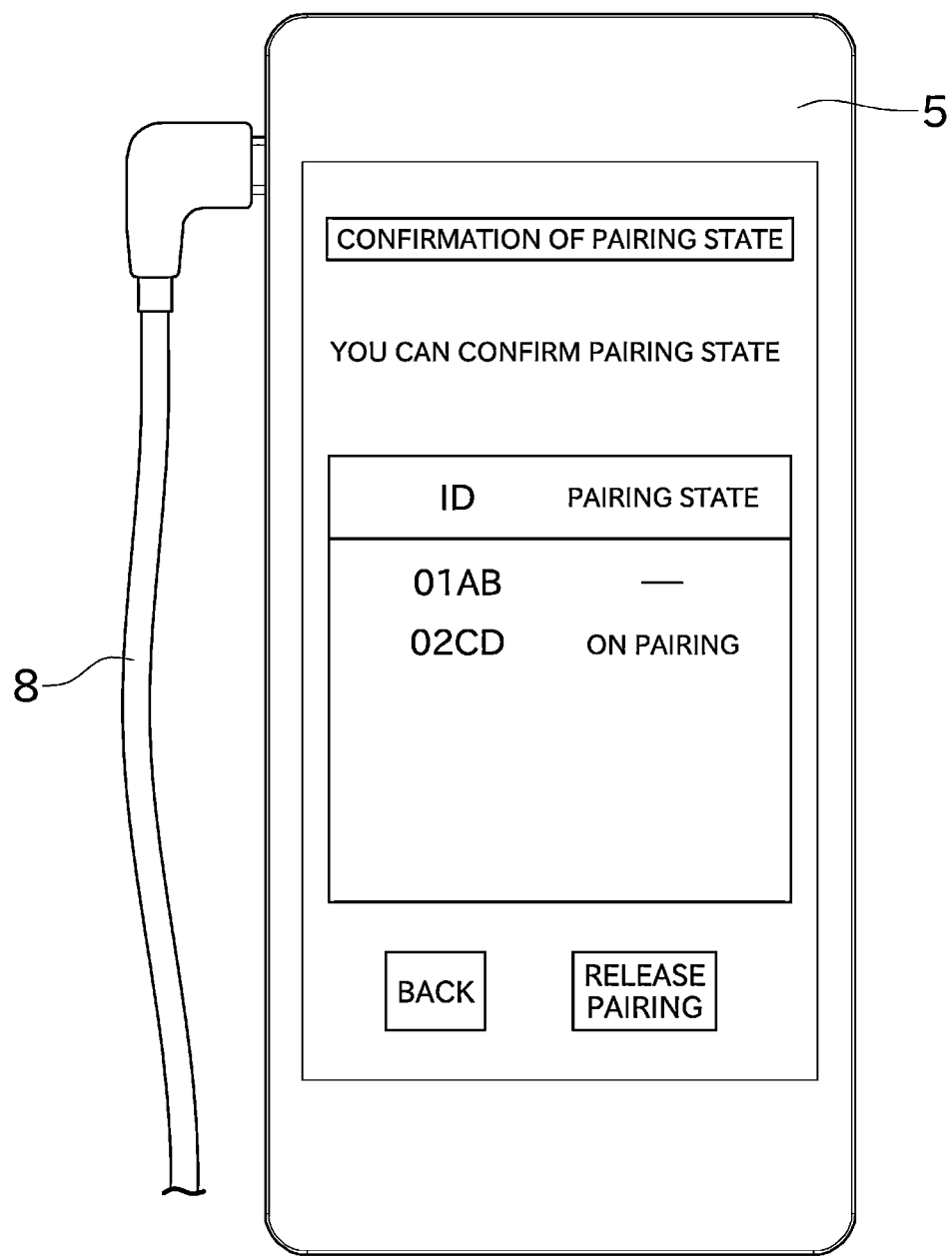
FIG. 14 is an example of displaying pairing state of a second receiver on a tablet.

FIG. 14 shows an example of a display screen. In the display screen, a list of IDs of the portable remote controllers 6A, 6B that are registered in the second receiver 22A as permitted communication partner is displayed. The line in which the ID is 01AB corresponds to the portable remote controller 6A. The line in which the ID is 02CD corresponds to the portable remote controller 6B. Information whether the device is paired with the second receiver 22A is displayed at each line. From the content of the display in FIG. 14, the operator can recognizes that the second receiver 22A is in the pairing state with the portable remote controller 6B.

In the state of FIG. 14, the operator taps a line of the portable remote controller 6B to select it, and then taps the "release of pairing" button to instruct the release of the pairing. The tablet 5 accordingly transmits the instruction to the second receiver 22A, and the second receiver 22A stores that the pairing state with the portable remote controller 6B is released in the non-volatile memory.

As described above, the pairing state between the portable remote controller 6B and the second receiver 22A can be forcibly released. The, the operator disconnects the USB cable 8 from the second receiver 22A, switches the second receiver 22A from maintenance mode to normal mode, and starts it up. Accordingly, another portable remote controller 6A is thus able to connect to the second receiver 22A.

Although the above is the operation to forcibly release the pairing state with respect to the second receiver 22A, the forced release operation can also be performed with respect to the portable remote controller 6B. For example, if the second receiver 22A fails, the operator connects the USB cable 64 of the portable remote controller 6B to the tablet 5, starts the portable remote controller 6B in the maintenance mode, and make the tablet 5 execute the maintenance tool. Accordingly, the operator is able to view the pairing information stored in the non-volatile memory of the portable remote controller 6B and to store the release of the pairing state in the non-volatile memory, as in the above case.

While preferred embodiments and variations of the present invention have been described above, the features described above may be modified, for example, as follows.

The operation of the portable remote controller 6B and the second receiver 22A, which is a condition to re-establish the connection, can be any other operation instead of the turning them on. For example, a reset button may be provided on the portable remote controller 6B and the second receiver 22A, and the operation of pressing the button meets the condition.

In the above preferred embodiments, the second receiver 22A transmits a connection status signal including information that the paired portable remote controller 6A is already present to the unpaired portable remote controller 6A. Accordingly, since the portable remote controller 6A can recognize that it cannot connect to the second receiver 22A, even if the operator tries to operate the portable remote controller 6A to establish the wireless connection with the second receiver 22A, the portable remote controller 6A does not specifically transmit the connection request to the second receiver 22A and the portable remote controller 6A displays an error on the remote controller 6A side. As a result, the establishment of the wireless connection is effectively prevented. However, the unpaired portable remote controller 6A may transmit the connection request to the second receiver 22A. In the case, the second receiver 22A rejects the connection request, thus preventing the establishment of the wireless connection. Accordingly, the connection status signal transmitted by the second receiver 22A to the unpaired portable remote controller 6A may not include information indicating that the paired portable remote controller 6 is present.

When the operator uses the maintenance tool on the tablet 5, instead of the password authentication, for example, pattern authentication, biometric authentication, or the like, may be required. In the case of the pattern authentication, the operator enters a pattern as the authentication information on the tablet 5. In the case of the biometric authentication, the operator inputs information on the physical characteristics as the authentication information by having a suitable sensor provided by the tablet 5 to read the physical characteristics.

The second receiver 22 may be provided with a touch panel display, for example, and may allow the pairing state to be forcibly released by direct operation of the second receiver 22 by the operator without connecting the tablet 5 to the second receiver 22. Accordingly, the second receiver 22 preferably requests an authentication operation, for example, password authentication.

When the operator forcibly releases the pairing state of the second receiver 22A using the maintenance tool, the pairing state may also be forcibly released in the portable remote controller 6B, which is the pairing partner, in conjunction. This feature may be provided, for example, by wirelessly transmitting a forced release signal from the second receiver 22A to the portable remote controller 6B.

The safety signal system 20 can also be applied to industrial machines other than the stacker crane 12.

The wireless communication systems of preferred embodiments of the present invention can be applied to a case where signals other than the enable signal and the emergency stop signal are transmitted from a transmitter to a receiver.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A wireless communication system comprising:
a transmitter to wirelessly transmit an instruction; and
a receiver to control an industrial machine according to the instruction received from the transmitter; wherein
a wireless connection between the transmitter and the receiver is able to be established by being in a partner fixed state in which the receiver is fixed as a connection partner of the transmitter;
after the wireless connection is established, the partner fixed state is continued in a state in which the wireless connection is not able to be maintained before an operation to disconnect the wireless connection is performed;
after the wireless connection is not able to be maintained, the wireless connection between the transmitter and the receiver is re-established on a condition that a predetermined operation is performed on both the transmitter and the receiver which are in the partner fixed state;
when the wireless connection between the transmitter and the receiver is not able to be maintained and the partner fixed state is continued, the partner fixed state is released by performing a forced release operation to forcibly release the partner fixed state to at least one of the transmitter and the receiver; and
the forced release operation includes:
an operation to enable at least one of the transmitter and the receiver in which the partner fixed state is continued to be in a maintenance mode in which a setting about the partner fixed state is able to be performed; and
an authentication operation to input authentication information to at least one of the transmitter and the receiver.

2. The wireless communication system according to claim 1, wherein
after the wireless connection is established, the receiver wirelessly transmits a confirmation signal to the transmitter to confirm whether the wireless connection between the transmitter and the receiver is normal or not; and
the receiver determines that the wireless connection is not able to be maintained when the receiver does not receive a response to the confirmation signal from the transmitter to which the confirmation signal is sent.

3. The wireless communication system according to claim 1, wherein information indicating that at least one of the transmitter and the receiver is in the partner fixed state or not is able to be output to other device.

4. The wireless communication system according to claim 1, wherein the predetermined operation to satisfy the condition of re-establishing the wireless connection between the transmitter and the receiver performed on both the transmitter and the receiver includes an operation of turning on power.

5. A wireless communication system comprising:
a transmitter to wirelessly transmit an instruction; and
a receiver to control an industrial machine according to the instruction received from the transmitter; wherein a wireless connection between the transmitter and the receiver is able to be established by being in a partner fixed state in which the receiver is fixed as a connection partner of the transmitter;

after the wireless connection is established, the partner fixed state is continued in a state in which the wireless connection is not able to be maintained before an operation to disconnect the wireless connection is performed;

after the wireless connection is not able to be maintained, the wireless connection between the transmitter and the receiver is re-established on a condition that a predetermined operation is performed on both the transmitter and the receiver which are in the partner fixed state; and the predetermined operation to satisfy the condition of re-establishing the wireless connection between the transmitter and the receiver performed on both the transmitter and the receiver includes an operation of turning on power.

6. The wireless communication system according to claim 5, wherein when the wireless connection between the transmitter and the receiver is not able to be maintained and the partner fixed state is continued, establishment of another wireless connection between another transmitter and the receiver is prevented.

7. The wireless communication system according to claim 5, wherein after the wireless connection is established, the receiver wirelessly transmits a confirmation signal to the transmitter to confirm whether the wireless connection between the transmitter and the receiver is normal or not; and the receiver determines that the wireless connection is not able to be maintained when the receiver does not receive a response to the confirmation signal from the transmitter to which the confirmation signal is sent.

8. The wireless communication system according to claim 5, wherein information indicating that at least one of the transmitter and the receiver is in the partner fixed state or not is able to be output to other device.

9. A wireless communication system comprising:

a transmitter to wirelessly transmit an instruction; and a receiver to control an industrial machine according to the instruction received from the transmitter; wherein a wireless connection between the transmitter and the receiver is able to be established by being in a partner fixed state in which the receiver is fixed as a connection partner of the transmitter;

after the wireless connection is established, the partner fixed state is continued in a state in which the wireless connection is not able to be maintained before an operation to disconnect the wireless connection is performed after the wireless connection is not able to be maintained, the wireless connection between the transmitter and the receiver is re-established on a condition that a predetermined operation is performed on both the transmitter and the receiver which are in the partner fixed state;

after the wireless connection is established, the receiver wirelessly transmits a confirmation signal to the transmitter to confirm whether the wireless connection between the transmitter and the receiver is normal or not; and the transmitter determines that the wireless connection is not able to be maintained when the transmitter does not receive the confirmation signal from the receiver.

10. The wireless communication system according to claim 9, wherein when the wireless connection between the transmitter and the receiver is not able to be maintained and the partner fixed state is continued, establishment of another wireless connection between another transmitter and the receiver is prevented.

11. The wireless communication system according to claim 9, wherein the predetermined operation to satisfy the condition of re-establishing the wireless connection between the transmitter and the receiver performed on both the transmitter and the receiver includes an operation of turning on power.

12. The wireless communication system according to claim 9, wherein information indicating that at least one of the transmitter and the receiver is in the partner fixed state or not is able to be output to other device.

* * * * *